(12) United States Patent
Jain et al.

(10) Patent No.: US 11,671,341 B2
(45) Date of Patent: Jun. 6, 2023

(54) NETWORK MONITORING METHOD AND NETWORK MONITORING APPARATUS

(71) Applicant: Hughes Network Systems, LLC, Germantown, MD (US)

(72) Inventors: Kaustubh Jain, Germantown, MD (US); Chi-Jiun Su, Germantown, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 0 days.

(21) Appl. No.: 16/576,052

(22) Filed: Sep. 19, 2019

(65) Prior Publication Data
US 2021/0092036 A1 Mar. 25, 2021

(51) Int. Cl.
  *H04L 43/0888* (2022.01)
  *H04L 43/0894* (2022.01)
  *H04L 47/80* (2022.01)
  *H04L 43/16* (2022.01)
  *H04L 43/062* (2022.01)

(52) U.S. Cl.
  CPC ........ *H04L 43/0888* (2013.01); *H04L 43/062* (2013.01); *H04L 43/0894* (2013.01); *H04L 43/16* (2013.01); *H04L 47/805* (2013.01)

(58) Field of Classification Search
  CPC ......... H04L 43/08; H04L 43/16; H04L 43/45; H04L 43/53; H04L 43/55; H04L 43/062; H04L 43/0888; H04L 43/0894; H04L 47/10; H04L 47/80; H04L 47/805; H04L 41/50; H04L 41/5019; H04L 41/5038; H04L 41/5067; H04L 41/5074; H04L 65/80; H04L 65/4069; H04L 67/04; H04L 67/18; H04L 67/322; H04L 67/2828; H04L 12/2838; H04L 45/122
  USPC .......................................... 709/224
  See application file for complete search history.

(56) References Cited

U.S. PATENT DOCUMENTS

| | | | | |
|---|---|---|---|---|
| 7,509,229 | B1 * | 3/2009 | Wen | H04L 41/16 702/179 |
| 9,584,180 | B1 * | 2/2017 | Bilger | H04B 3/02 |
| 10,298,653 | B1 * | 5/2019 | Cheng | H04L 65/80 |
| 10,581,664 | B1 * | 3/2020 | Peng | H04W 4/24 |
| 2003/0048754 | A1 * | 3/2003 | Bruckman | H04L 43/50 370/252 |
| 2003/0084146 | A1 * | 5/2003 | Schilling | H04L 41/0631 709/224 |
| 2003/0186651 | A1 * | 10/2003 | Weston | H04L 47/824 455/39 |

(Continued)

OTHER PUBLICATIONS

Strowes, Stephen D., "Passively measuring TCP round-trip times" 2013, ACM (Year: 2013).*

(Continued)

*Primary Examiner* — James N Fiorillo
(74) *Attorney, Agent, or Firm* — Global IP Counselors, LLP

(57) ABSTRACT

A network monitoring method includes: monitoring, at a network node, one or more network statistics for each of one or more objects exchanged between a client end point and a server end point through a network connection, the network node being located between the client end point and the server end point; and determining one or more QoS metrics for each of the one or more objects based on the network statistics for respective one of the one or more objects.

17 Claims, 17 Drawing Sheets

(56) References Cited

U.S. PATENT DOCUMENTS

| | | | | | |
|---|---|---|---|---|---|
| 2005/0213586 | A1* | 9/2005 | Cyganski | | H04L 47/10 370/395.41 |
| 2006/0253566 | A1* | 11/2006 | Stassinopoulos | ... | H04L 43/0876 709/224 |
| 2008/0002576 | A1* | 1/2008 | Bugenhagen | | H04L 67/1012 370/229 |
| 2009/0059797 | A1* | 3/2009 | Northcutt | | H04L 45/122 370/238 |
| 2009/0150857 | A1* | 6/2009 | Srinivasan | | G06F 30/30 717/104 |
| 2009/0232012 | A1* | 9/2009 | Zseby | | H04L 47/41 370/252 |
| 2010/0050023 | A1* | 2/2010 | Scarpelli | | G06F 11/079 714/E11.029 |
| 2015/0082345 | A1* | 3/2015 | Archer | | G06Q 30/0275 725/34 |
| 2016/0065444 | A1* | 3/2016 | Schunder | | H04W 24/10 370/252 |
| 2016/0088322 | A1* | 3/2016 | Horev | | H04N 21/23418 725/14 |
| 2016/0212031 | A1* | 7/2016 | Jain | | H04L 43/0876 |
| 2016/0308709 | A1* | 10/2016 | Fernandez-Palacios Gimenez | ..... | H04L 12/6418 |
| 2017/0048297 | A1* | 2/2017 | Funge | | H04L 67/61 |
| 2017/0195393 | A1* | 7/2017 | Su | | H04L 65/4084 |
| 2017/0339040 | A1* | 11/2017 | Ganesan | | H04L 43/0888 |
| 2017/0346705 | A1* | 11/2017 | Szilagyi | | H04L 41/0823 |
| 2017/0359735 | A1* | 12/2017 | Jain | | H04W 24/10 |
| 2018/0034598 | A1* | 2/2018 | Yiu | | H04W 52/0216 |
| 2018/0131593 | A1 | 5/2018 | Jain et al. | | |
| 2018/0131620 | A1 | 5/2018 | Su et al. | | |
| 2020/0112876 | A1* | 4/2020 | Sridhar | | H04W 28/0268 |
| 2020/0186615 | A1* | 6/2020 | Halepovic | | H04L 65/1063 |

OTHER PUBLICATIONS

V. Aggarwal, E. Halepovic, J. Pang, S. Venkataraman, and H. Yan, "Prometheus: toward quality-of-experience estimation for mobile apps from passive network measurements" In Proceedings of the 15th Workshop on Mobile Computing Systems and Applications (HotMobile '14), Feb. 26-27, 2014, 6 pages.

M. Trevisan, I. Drago, and M. Media. "PAIN: A Passive Web Speed Indicator for ISPs", In Proceedings of the Workshop on QoE-based Analysis and Management of Data Communication Networks (Internet QoE '17), Aug. 21, 2017, pp. 7-12.

* cited by examiner

NETWORK MONITORING METHOD AND NETWORK MONITORING APPARATUS

BACKGROUND

Field of the Invention

This invention generally relates to a network monitoring method. This invention also relates to a network monitoring apparatus.

Background Information

Internet Service Providers (ISPs) manage and operate large and complex networks with many components. To provide reliable network services while efficiently utilizing the network resources, they monitor a huge list of metrics focusing on various aspects/components of the networks. However, metrics that capture the impact of network conditions on user applications and their quality of experience is missing. Currently, for such analysis, active measurements on a subset of test terminals have to be carried out, which limit their use in monitoring or detecting performance degradations.

The usual set of network monitoring software deal with metrics or stats from various network layers like IP, MAC, PHY, etc. They include metrics focusing on various subcomponents, nodes or algorithms in the network which try to capture their individual health. If any of these metrics indicate poor values (according to some pre-defined thresholds), appropriate alerts are generated with identifying statecode, so that corrective actions can be taken by the network engineers accordingly. Some examples of Network Monitoring Systems include Cisco's Network Analysis Module, ScienceLogic's EM7, etc. However, these are usually covering the bottom-up approach (i.e., starting with the metrics capturing the lower layer performance) or system-wide performance. However, no industry solution exists, which are end-user centric.

SUMMARY

Recently, there have been some research efforts which attempt to extend the metric set to include higher-layers (which work even for encrypted HTTPS traffic) and user Quality of Experience (QoE). They focus on passive measurement and end-user impact estimation. However, they have many limitations. For example, one research attempts to model different QoE metrics for different mobile applications using existing network measurements, which include some TCP-layer features (see V. Aggarwal, E. Halepovic, J. Pang, S. Venkataraman, and H. Yan, "Prometheus: toward quality-of-experience estimation for mobile apps from passive network measurements" In Proceedings of the 15th Workshop on Mobile Computing Systems and Applications (HotMobile '14), for example). However, the models learn and capture the dependence of these lower-layer metrics on pre-specified set of QoE metrics for known applications. They may need to be re-trained for other types of networks (non-cellular) and newer sets of internet applications or QoE metrics. Moreover, their approach does not attempt to derive higher-layer Quality of Service (QoS) metrics.

Similarly, another research attempts to passively measure some indicators to capture a specific set of QoE metric— web page load time (see M. Trevisan, I. Drago, and M. Mellia. "PAIN: A Passive Web Speed Indicator for ISPs", In Proceedings of the Workshop on QoE-based Analysis and Management of Data Communication Networks (Internet QoE '17), for example).

While they cover at least some scenarios to detect network performance degradation for the end-users, none of these methods provide any pointers to the root cause to enable network diagnostic, automated or otherwise.

Generally, the present disclosure is directed to various features of a network monitoring method and a network monitoring apparatus.

In accordance with one aspect of the present disclosure, a network monitoring method includes: monitoring, at a network node, one or more network statistics for each of one or more objects exchanged between a client end point and a server end point through a network connection, the network node being located between the client end point and the server end point; and determining one or more QoS metrics for each of the one or more objects based on the network statistics for respective one of the one or more objects.

In accordance with another aspect of the present disclosure, a network monitoring apparatus includes a processor configured to monitor, at a network node, one or more network statistics for each of one or more objects exchanged between a client end point and a server end point through a network connection, the network node being located between the client end point and the server end point. The processor is further configured to determine one or more QoS metrics for each of the one or more objects based on the network statistics for respective one of the one or more objects.

With the present disclosure, the one or more QoS metrics can be used directly without knowledge of any new applications or QoE metrics, for example. Furthermore, the one or more QoS metrics can be used for varied networks (terrestrial, cellular, satellite, etc.), which little efforts in establishing appropriate thresholds given the network in focus, for example.

Also other objects, features, aspects and advantages of the present disclosure will become apparent to those skilled in the art from the following detailed description, which, taken in conjunction with the annexed drawings, discloses one embodiment of the network monitoring method and the network monitoring apparatus.

BRIEF DESCRIPTION OF THE DRAWINGS

Referring now to the attached drawings which form a part of this original disclosure.

DETAILED DESCRIPTION OF EMBODIMENTS

Figure 1:
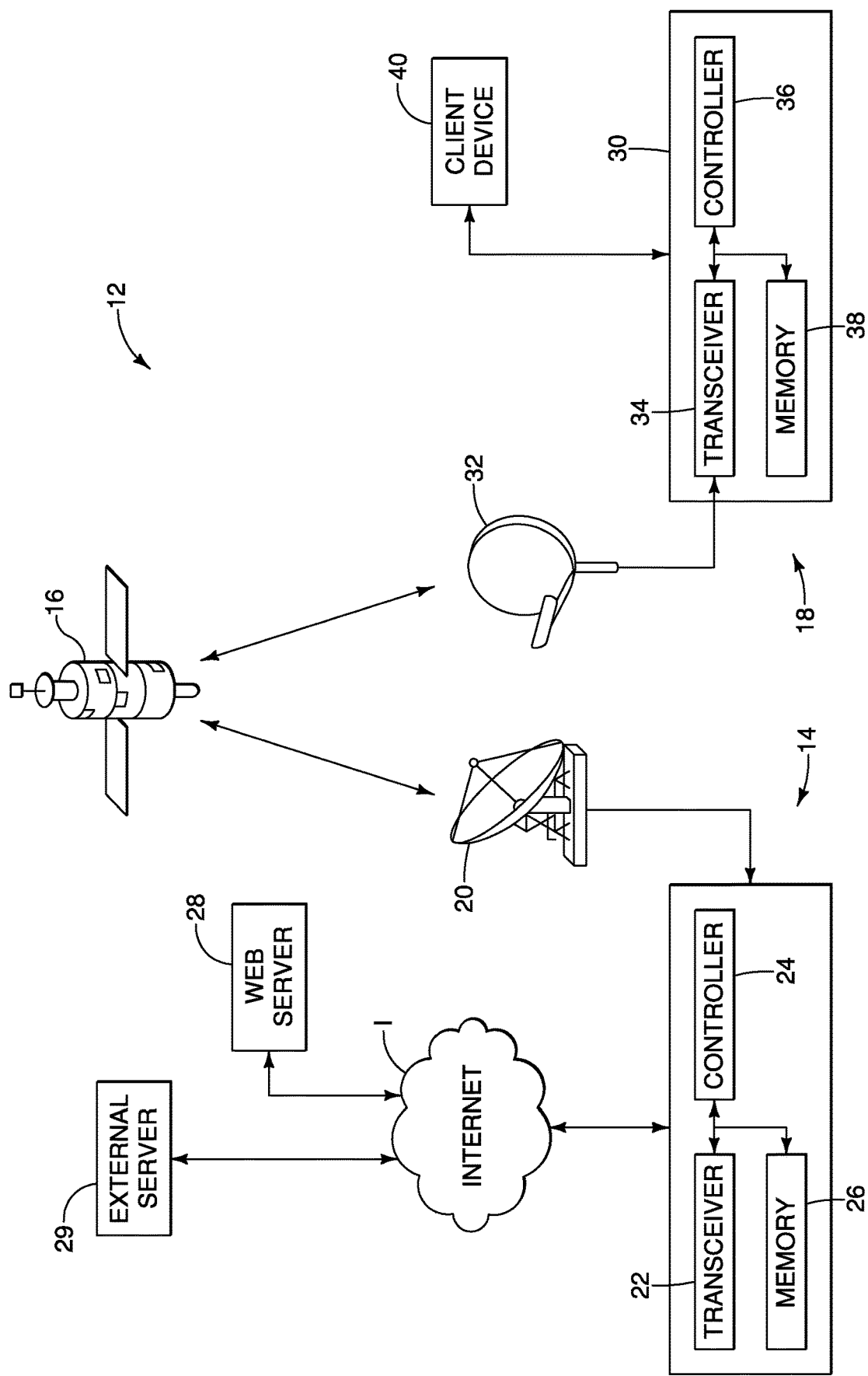
FIG. 1 illustrates an example of a satellite communication network according to one embodiment.

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

In the illustrated embodiment, a network diagnostic algorithm or method (e.g., a network monitoring method) for passive estimation of application-layer Quality of Service (QoS) Metrics and for automated network diagnostics is provided. More specifically, firstly, a network diagnostic algorithm to estimate application-layer QoS metrics as experienced by the consumers, from within a network of an Internet Service Provider (ISP), in a passive way (no additional traffic for measurement) is provided. In particular, the network diagnostic algorithm provides an inexpensive way to derive estimates of QoS metrics continuously by passively monitoring consumer traffic from a vantage point within the ISP's network (e.g., Consumer Premise Equipment (CPE), such as cable, fiber-optic or DSL modem). These QoS metrics accurately capture the network conditions as experienced by the end user or client devices or interne applications. This is achieved without any need for cooperation from/or instrumentation of user devices or measurements hooks from the server or client applications. In the illustrated embodiment, as described later, the QoS metrics at the client device can also be estimated even if the vantage point is away from the client device. For example, vantage points can be ISP/Core Network Gateways, and away from the client device. In the illustrated embodiment, the QoS metrics can be estimated as the QoS metrics for the entire path till the client end point and/or till the vantage point.

With the network diagnostic algorithm, these application-layer QoS metrics can be used in addition to existing set of network stats for more accurate network performance monitoring. With the network diagnostic algorithm, these new QoS metrics can be used in multiple ways like comparing, benchmarking normal and degraded network conditions; identifying patterns and trends; generating network alerts; aid in network diagnostics, etc. The second part of the main contribution of the present disclosure is the use of these QoS metrics in automated network diagnostics. In the illustrated embodiment, a few algorithms in which these QoS metrics can be used (by themselves or with other available network stats) is provided for detecting the root cause of degraded network performance. Depending upon the set of metrics available, more detailed automated root cause analysis can be achieved through the network diagnostic algorithm of the present disclosure, without the need for human involvement. These set of algorithms are complementary to some of the other automated network diagnostic algorithms which start from lower-layer metrics. The network diagnostic algorithm of the present disclosure having a top-down approach from user perspective complements the usual bottom-up approach using network component stats and alerts.

Lastly, by being able to passively estimate QoS metrics and automatically detect network performance degradation and its root cause, the network diagnostic algorithm of the present disclosure enables automatically taking corrective action by appropriate network components, whenever possible. For this last step of auto-correction, the exact set of actions and mechanism to exercise/execute them will not be described in detail in the present disclosure.

Referring now to FIGS. 1 to 18, the network diagnostic algorithm of the present disclosure will be described in detail.

1. Introduction

Internet Service Providers (ISPs) operate and manage large networks with many components and algorithms interacting in complex ways. While the network designers have many metrics or sensors which focus on the health conditions for various components and sub-components, they sometimes do a poor job of estimating or measuring the impact on consumers' Quality of Experience (QoE) and the role of network Quality of Service (QoS). For example, ISPs have thousands of metrics that capture various PHY-, MAC-, IP-layer metrics for various network segments, but still have to rely on simulations (during designing) or active tests/measurements (on a small set of end terminals) to figure out user application performance and their experience. Doing this on a much larger scale, and all the time, in the real network is currently difficult. Also, when troubleshooting consumer complaints, network engineers have to perform (or ask users) to run some active tests in many scenarios—where all the network components are seemingly in good enough conditions, but the poor user experiences due to network conditions are just as real.

Apart from the PHY-, MAC-, IP-layer metrics, the ISPs also have metrics for capturing the utilization, efficiency, reliability, etc. for various components like routers, resource scheduling blocks (/algorithms), link capacity metrics, link availability percentage, etc. Some ISP networks that have special/asymmetric link characteristics than usual (like Satellite), deploy TCP Performance Enhancing Proxies (PEP) to efficiently use the network resources. PEP split TCP connections between clients and server, resulting in what are sometimes called spoofed TCP connections. Such networks also have TCP PEP related metrics for the various PEP segments. Similarly, HTTP proxies might be deployed for unencrypted webpages, and have associated HTTP-level metrics. However, with the increasing adoption of HTTPS for most web traffic, such HTTP proxies are useful in rapidly decreasing scenarios.

These existing set of network metrics are used to monitor the network performance and detect degraded states, if any. They are definitely very useful whenever a specific component is not performing well (e.g., some network link keeps going down—captured by a link availability metric) and directly point the root cause of network degradation. However, many times, the network components are functioning at reasonable levels, but their combined impact on some set of end users/consumers might lead to poor user QoE, which is difficult to be captured by the current set of metrics. For example, the overall capacity utilization is good (not fully congested) for a high-volume link (e.g., Downlink from Satellite Gateway to hundreds of user terminals/Consumer Premise Equipment (CPE)); and additionally, the scheduling fairness metrics show reasonably equitable distribution between different CPEs; however, there may be a few CPEs with poor downlink quality that impact the users' QoE. Such coverage gaps in existing set of metrics are common in many ISP networks. For the above example, it might have been possible to detect degraded performance by setting lower thresholds for some of the metrics, but that might lead to too many 'false' detects. Hence, new metrics are needed which capture the network QoS which are closer to the user QoE. Such metrics should try to capture the combined impact of all the relevant network components on the network conditions available for the user applications. Here, the terms QoS and QoE are distinguished relative to each other as follows: user QoE is shaped both by the internet application and the network conditions (e.g., Video quality for streaming over an Adaptive BitRate based app); whereas, network QoS is trying to capture just the network conditions (e.g., Download Speed, assuming the user application has enough traffic to fill the pipe).

Thus, as part of understanding QoS for Internet users, key QoS metrics that capture the user experience is desired to be quantified or estimated. As mentioned earlier, there are many metrics captured for various components of the network, but none (or few) that capture their combined impact on the users. For example, even though most network component metrics are with the 'good' range, there are cases when some users still get poor quality of service because of the complex interaction of the various network components. Hence, new QoS metrics that capture the impact on individual user terminals are desired. One can, of course, capture higher-layer metrics, like delays and data rates as seen by the application-layer on user/client devices. However, with the network diagnostic algorithm of the present disclosure, such application-layer QoS metrics are estimated from within the ISP's network, without access to the client device. FIG. 1 below shows one particular application in a satellite network setting.

Specifically, referring to FIG. 1, a satellite communication network 12 in accordance with one embodiment typically includes one or more terrestrially mounted gateways 14 (only one gateway 14 is shown in FIG. 1) that communicate with one or more orbiting satellites 16 (only one orbiting satellite 16 is shown in FIG. 1), which in turn are in communication with one or more very small aperture terminals (VSATs) 18 (only one VSAT 18 is shown in FIG. 1).

Each satellite gateway 14 includes an antenna dish 20, a communication interface or transceiver 22, a controller 24 (e.g., a processor or microcomputer), a memory 26 and other types of equipment (not shown) such as amplifiers, waveguides and so on as understood in the field of the satellite network communication, and establishes a satellite communication of the gateway 14 to the VSAT 18 via the orbiting satellite 16. The controller 24 controls various component of the satellite gateway 14, and can be configured to execute the network diagnostic algorithm as described later. The controller 24 can also include other conventional components such as an input interface circuit, an output interface circuit, and storage devices such as a ROM (Read Only Memory) device and a RAM (Random Access Memory) device. The RAM and ROM store processing results and control programs that are run by the controller 24. The controller 24 is operatively coupled to the components of the gateway 14 as appropriate, in a conventional manner. It will be apparent to those skilled in the art from this disclosure that the precise structure and algorithms for the controller 24 can be any combination of hardware and software that will carry out the functions of the network diagnostic algorithm of the present disclosure. The memory 26 can be, for example, an internal memory in the gateway 14, or other type of memory devices such as flash memory or hard drives with external high-speed interface such as a USB bus or an SATA bus, or remote memories such as cloud storage and so on.

The gateways 14, the satellites 16 and the VSATs 18 typically communicate with each other over a radio frequency link, such as a Ku-band link, a Ka-band link or any other suitable type of link as understood in the field of satellite network communication. Also, the gateways 14 can be configured as a network management center or network operating center which, among other things, operate to communicate with remote sites, such as web server 28 or other external servers 29 via the Internet I.

In the illustrated embodiment, each VSAT 18 includes a consumer premise equipment (CPE) or indoor unit (IDU) 30 and an antenna dish or outdoor unit (ODU) 32. The antenna dish 32 is connected generally via a coax cable to the CPE 30 that is disposed within a house, building or other facility or area. In the illustrated embodiment, the CPE 30 is a VSAT modem, and includes a communication interface or transceiver 34, a controller 36 (e.g., a processor), a memory 38 and other types of equipment (not shown) such as amplifiers, waveguides and so on as understood in the field of the satellite network communication, and establishes a satellite communication of the VSAT 18 to the gateway 14 via the orbiting satellite 16. The controller 36 controls various component of the VSAT 18, and can be configured to execute the network diagnostic algorithm as described later. The controller 36 can also include other conventional components such as an input interface circuit, an output interface circuit, and storage devices such as a ROM (Read Only Memory) device and a RAM (Random Access Memory)

device. The RAM and ROM store processing results and control programs that are run by the controller 36. The controller 36 is operatively coupled to the components of the VSAT 18 as appropriate, in a conventional manner. It will be apparent to those skilled in the art from this disclosure that the precise structure and algorithms for the controller 36 can be any combination of hardware and software that will carry out the functions of the network diagnostic algorithm of the present disclosure. The memory 38 can be, for example, an internal memory in the VSAT 18, or other type of memory devices such as flash memory or hard drives with external high-speed interface such as a USB bus or an SATA bus, or remote memories such as cloud storage and so on.

In the illustrated embodiment, the CPE 30 is also connected to a client terminal or device 40, such as a smart phone, a tablet, a computer, a television, a server, a printer, a storage device or any other suitable device), via wired or wireless connection. With this configuration, the client device 40 can be connected to the web server 28 via the Internet I and the satellite communication network 12.

In the illustrated embodiment, with the network diagnostic algorithm, network stats are collected at the CPE 30 (i.e., at the VSAT 18) to estimate the QoS at the client device 40. In other words, in the illustrated embodiment, the network diagnostic algorithm of the present disclosure is performed by the controller 36 of the CPE 30. However, instead of the ISP edge-device like the CPE 30 of the VSAT 18, the network diagnostic algorithm of the present disclosure for measuring the stats and estimating the QoS can be performed at the gateway 14 or other such internal node facing closer to the core internet. In this case, the network diagnostic algorithm of the present disclosure is performed by the controller 24 of the gateway 14. Furthermore, the network diagnostic algorithm of the present disclosure for measuring the stats and estimating the QoS can be performed by combining the measurements at the CPE 30 and the gateway 14 to get a more detailed view of the network conditions. Thus, in the illustrated embodiment, the CPE 30 of the VSAT 18 having the controller 36 and/or the gateway 14 having the controller 24 can be an example of a network diagnostic apparatus or system of the present disclosure. Also, in the illustrated embodiment, the CPE 30 of the VSAT 18 having the controller 36 and/or the gateway 14 having the controller 24 can be an example of a network node of the present disclosure.

In the illustrated embodiment, a couple of ways in which such metrics can be obtained by capturing key statistics at the CPE. In particular, estimates for useful application-layer QoS metrics, such as Time to First Byte, Time to Last Byte, Time to Download and Application-Layer Throughput, are derived. These QoS metrics are useful in network performance monitoring; useful to characterize different levels of normal, congested and/or degraded network conditions. Moreover, these QoS metrics can be used to identify the potential root cause of degradation in user's QoE. These higher-layer metrics can be combined with other network component or lower-layer metrics, as well as, QoE metrics if available, for more detailed root cause analysis.

Figure 2:
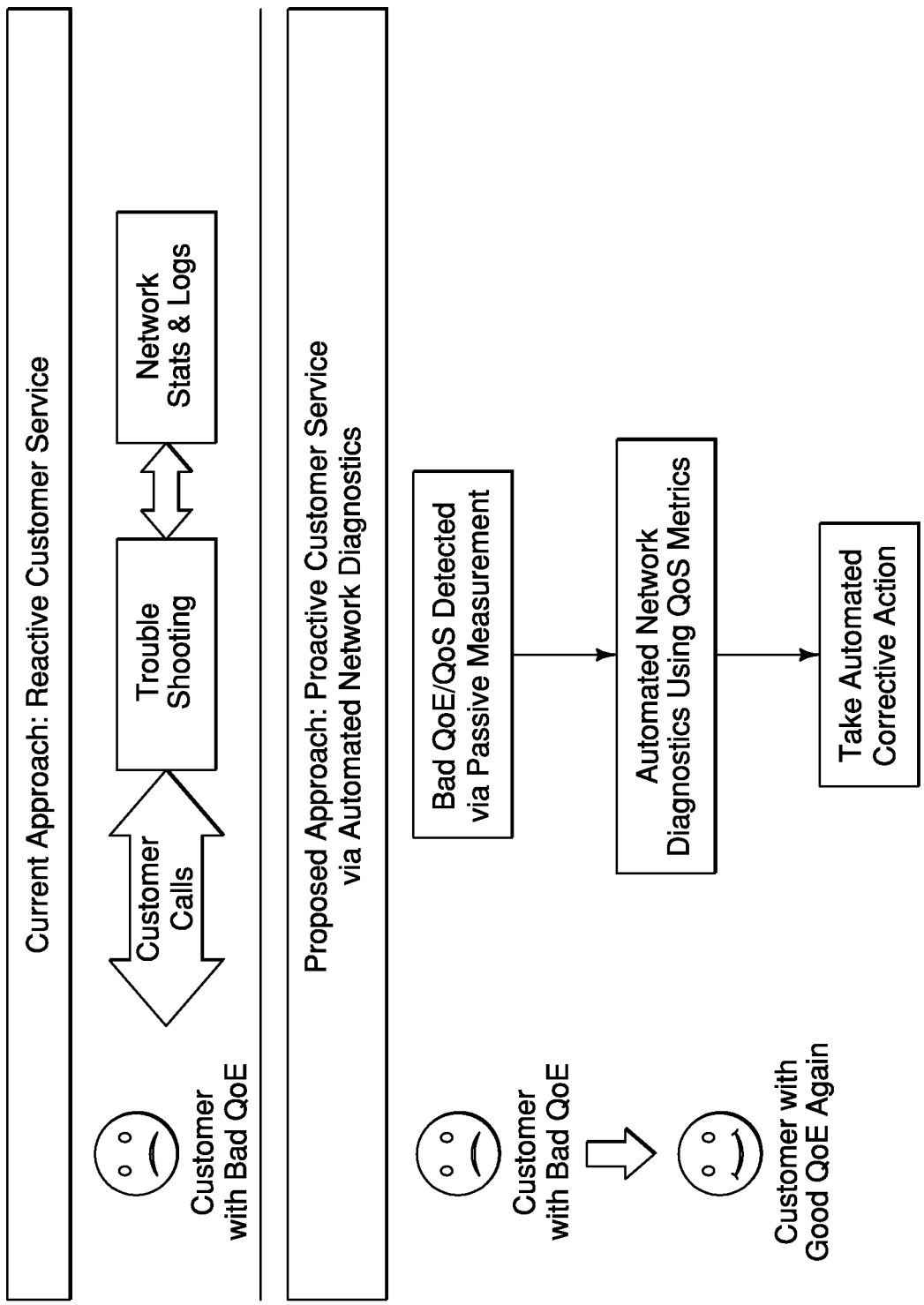
FIG. 2 illustrates a schematic diagram showing an overview of a network diagnostic algorithm according to the one embodiment.

FIG. 2 shows the main use case/motivation for the network diagnostic algorithm and the network diagnostic apparatus of the present disclosure. In particular, the passive monitoring of the application-layer QoS metrics (and QoE metrics) enable proactively detecting any performance degradation, and the automated network diagnostics algorithm can give the root causes, which can be used to troubleshoot and fix the identified issues. These automated network diagnostic algorithms using a subset of the new application-layer QoS metrics form the second part of the present disclosure. These automated network diagnostic algorithms can be combined with additional network stats/metrics, if available for more detailed root cause analysis. The application-layer QoS metric provides the top-down view, which can complement the bottom-up view from individual component health metrics (more details later), thereby enabling detailed root cause analysis pin-pointing the exact reason for degradation. Then, barring a few scenarios where human involvement is required (adding a new hardware), automatic corrective actions can be taken by the system (algorithmically) to fix the root cause.

Figure 3:
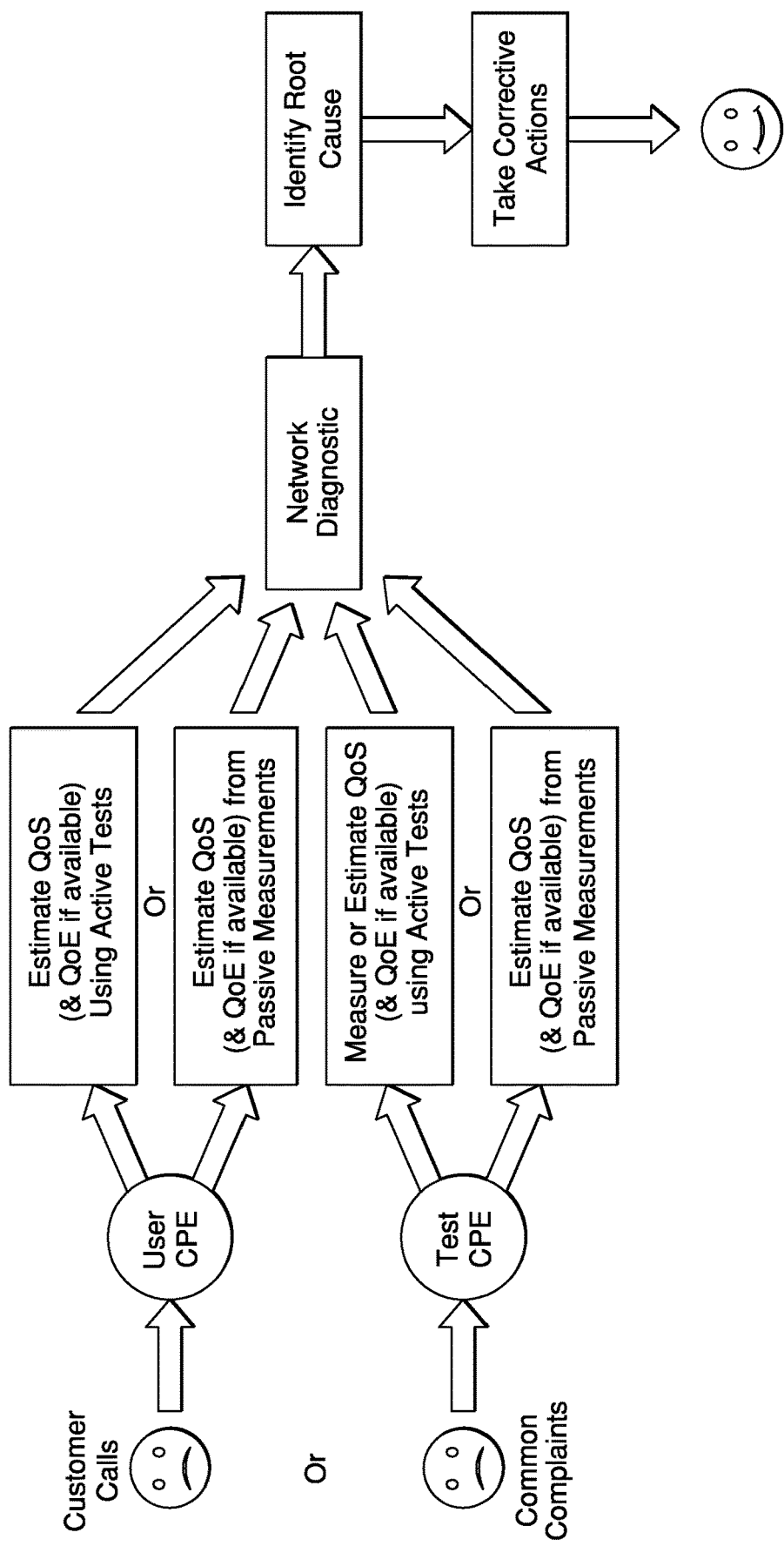
FIG. 3 illustrates a schematic diagram showing another application of the network diagnostic algorithm.

However, the advantages of these QoS metrics are not limited to automated network diagnostics. Of course, they can be used along with traditional network stats using the usual Network Monitoring Systems (NMS) approach, analyzing trends, setting appropriate thresholds and monitoring alerts, etc. Or these QoS metrics can be used for detailed troubleshooting of specific user terminals or common complaints (reproduces on test terminals), using either active tests/measurements for a short duration or passive measurements as shown in FIG. 3.

The rest of the present disclosure is organized as follows. In Section 2, the details about the input data/collected statistics is discussed. In Section 3, it is discussed how the input stats can be used to derive the estimates of useful application-layer QoS metrics, which forms the first part of the main contribution of the present disclosure. In Section 4, some sample use cases in how these QoS metrics can be used for network performance monitoring are discussed. In Section 5, additional QoS and QoE metrics that can be used for performance monitoring and network diagnostics are further introduced. In Section 6, it is discussed how the QoS metrics (and QoE metrics, if available) can be used for the automated network diagnostics, which forms the second part of the main contribution of the present disclosure. In particular, sample algorithms using just a small subset of metrics to perform root cause analysis of degraded network conditions are discussed. Furthermore, a couple of approaches where these metrics can be combined with additional metrics for more detailed and accurate root cause analysis are also discussed.

2. Input Data

As mentioned above, in the illustrated embodiment, network traffic data can be accessed from the CPE 30 (i.e., satellite VSAT modem), from which object-level data and connection-level data can be extrapolated (see Sections 2a and 2b). In some networks, the CPE 30 may deploy Performance Enhancing Proxies, where they split a TCP connection at the CPE 30 (instead of end-to-end from client device to content server). Such split connections are commonly called spoofed connections. TCP connections can be spoofed at multiple places with a network path. For satellite network, usually they are split at two locations (e.g., the nodes at the CPE 30 and the satellite gateway 14) to handle significant differences in different network segments/link characteristics. In the illustrated embodiment, the connection-level data includes TCP connection/flow statistics readily available at CPE 30 of the VSAT 18 for spoofed TCP connections, for example. On the other hand, depending upon available resources and configuration, some connections may not be spoofed. For unspoofed/unsplit TCP connections, the CPE 30 does not have transport-level data directly available. But similar information can be extracted by monitoring IP packet flows, or, in addition looking at the TCP and/or IP headers, as discussed in U.S. Patent Application Publication No. 2018/0131593 A1 (hereinafter "Reference 1"), which is incorporated by reference herein in its entirety. Furthermore, TCP/UDP segment sizes and/or IP packet bursts defined or detected using other methods can also be used as alternative sources. Such methods can also be useful for QUIC traffic over UDP.

The term "object-level data" referrers to the application-layer (e.g., HTTP(S)) Request-Response sizes and timing information. In the illustrated embodiment, the term "Request-Response" can be interpreted as HTTP GET (Request) from client and corresponding response form the server. However, this term can also be used to cover HTTP POST, PUT, etc. from the server; or also from the client when uploading data to the server, for example. Also, please refer "Reference 1" to see how the object-level data is estimated using transport-layer information available/derived at the CPE. In particular, this approach works even for encrypted traffic which use HTTP(S) or TLS for encrypting the data. As long as the transport-layer segments have unencrypted packet sequence number, the approach from "Reference 1" is usable. Furthermore, as discussed in U.S. Patent Application Publication No. 2017/0195393 A1 (hereinafter "Reference 2"), which is incorporated by reference herein in its entirety, an alternative way of obtaining the object-level statistics using TLS record-layer information, instead of using transport-layer information, can also be given. This approach works for TLS 1.1/1.2. In TLS 1.3, Content Type is encrypted, and Connect Length information is harder to retrieve since it is concealed by using padding. However, some approximations and heuristics could still be derived even in the case of TLS 1.3, with some additional efforts. Also, for QUIC & other non-TCP traffic, IP packet burst lengths can be used as heuristics for object estimates, where the requests and responses are defined by packets bursts in uplink and downlink directions, respectively. The following sections 2a and 2b illustrates examples of input data (statistics). Of course, the input data of the present disclosure is not limited to those examples and different input data can be used as needed and/or desired.

2a. Connection-Level Data

For a given connection, the Server IP Address, Destination IP Address, Server Port, and Destination Port can be achieved. In the illustrated embodiment, such connection includes, but not limited to, Transport-Layer connection like TCP/UDP connection including QUIC, for example. Furthermore, the start and end times of the connection (startConnTime, endConnTime), the number of objects in the connection, and the total number of bytes sent and received within the connection can also be achieved.

2b. Object-Level Data

For a given object, the Server IP address, Destination IP address, Server Port, and Destination Port can be achieved, and can be used to match the object with the connection. Furthermore, the index of the object within the connection (objectIndex), time at which it was requested (startRequestTime), time when the request ended (endRequestTime), time when the response started (startResponseTime), time when the response ended (endResponseTime), request size in bytes, response size in bytes, number of packets in the request, and number of packets in the response, can also be achieved.

Figure 4:
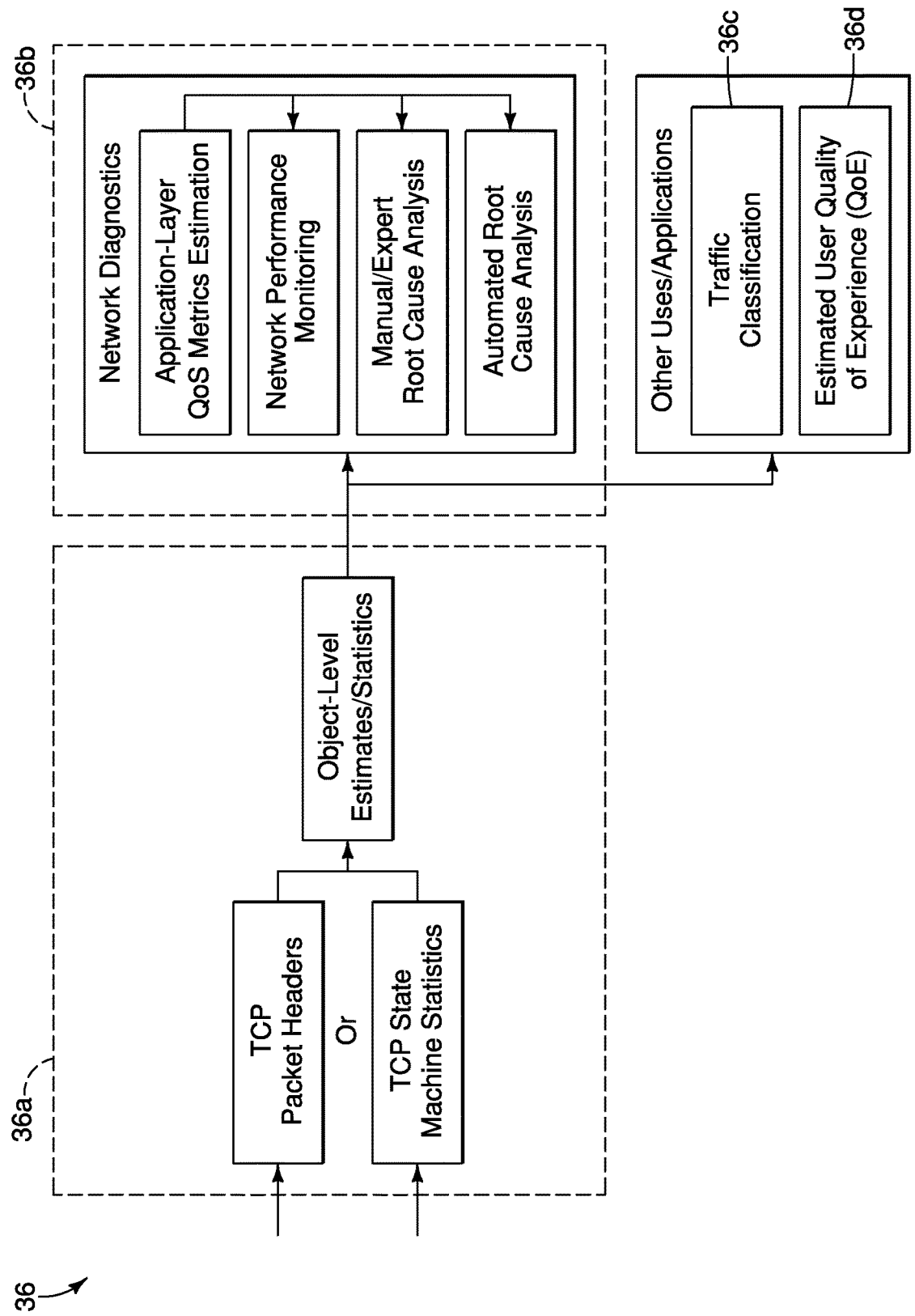
FIG. 4 illustrates a schematic block diagram illustrating operations of the network diagnostic algorithm according to the one embodiment.

Based on the object-level estimates, the useful application-layer QoS metrics as described in Section 3 can be derived. The QoS metric estimates, in turn, can be used for performance monitoring, and network diagnostic to determine the root cause of degraded performance. FIG. 4 illustrates a functional block diagram of the network diagnostic performed by the controller 36 of the CPE 30, showing how the various pieces of functions fit together. Subsequent sections cover the network performance monitoring and diagnostics aspects of the proposed system. Specifically, FIG. 4 illustrates an object-level data obtaining function 36a, a network diagnostic function 36b, a traffic classification function 36c and a QoE estimation function 36d. In particular, the controller 36 performs the object-level data obtaining function 36a that obtains object-level estimates/statistics by monitoring the TCP state machine at the CPE 30 or TCP packet headers at the CPE 30 in a manner described in "Reference 1." Of course, the object-level data obtaining function 36a is not limited to this, and can use other blocks/methods (e.g., packet burst) to estimate the object-level estimates/statistics for QUIC/UDP or other non-TCP traffic. The controller 36 further performs the network diagnostic function 36b on which the present disclosure mainly focuses. In particular, the controller 36 performs an application-layer QoS metrics estimation, a network performance monitoring, a manual/expert root cause analysis, and an automated root cause analysis. Furthermore, optionally or additionally, the controller can perform the traffic classification function 36c in a manner described in "Reference 1," and the QoE estimation function 36d in a manner described in "Reference 3" (described later).

3. Estimating Application-Layer QoS Metrics

Figure 16:
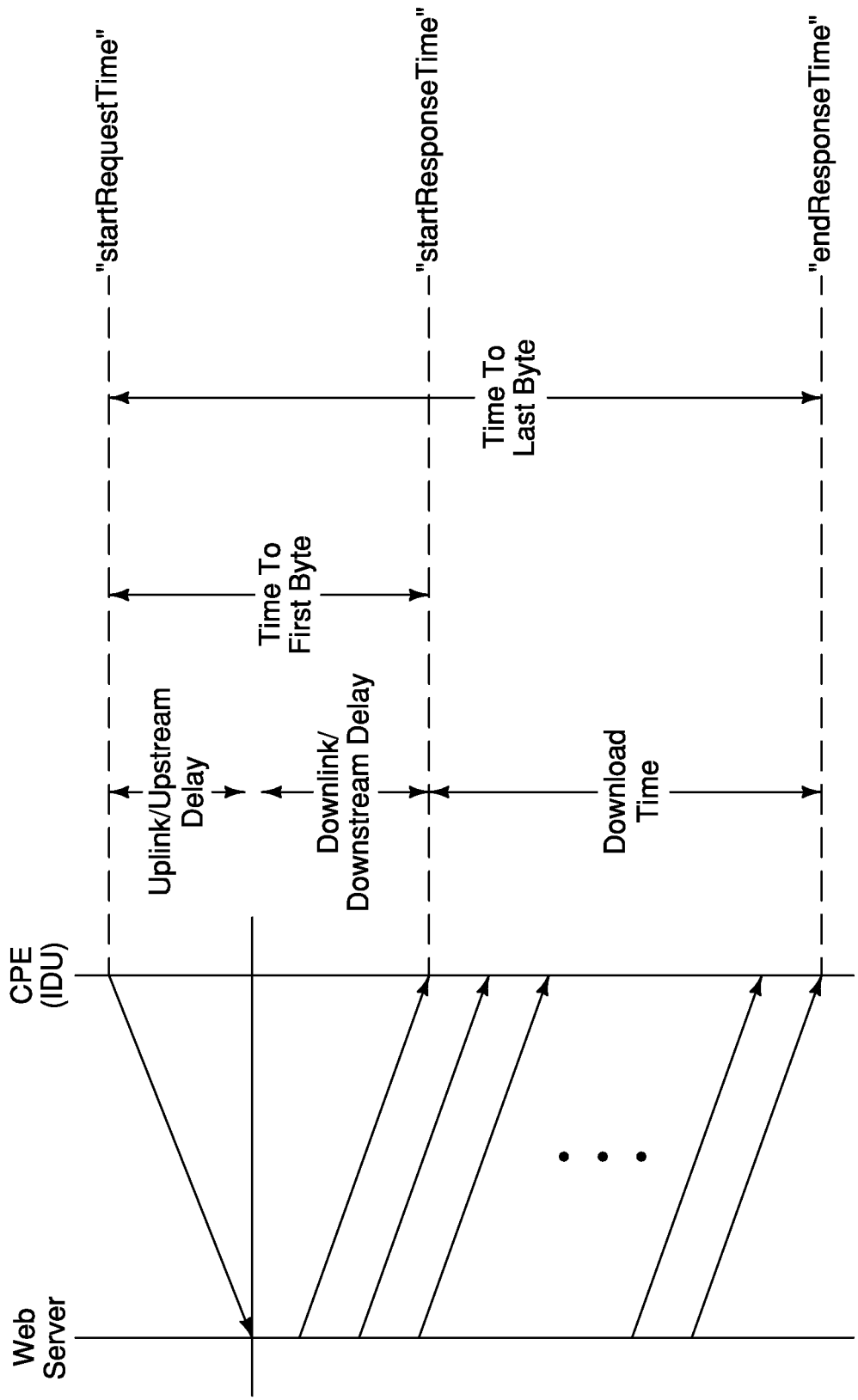
FIG. 16 illustrates a schematic timing chart of network traffic data exchanged between a consumer premise equipment (CPE) and a web server, the application-layer QoS metrics being derived based on timings of the network traffic data.
Figure 17:
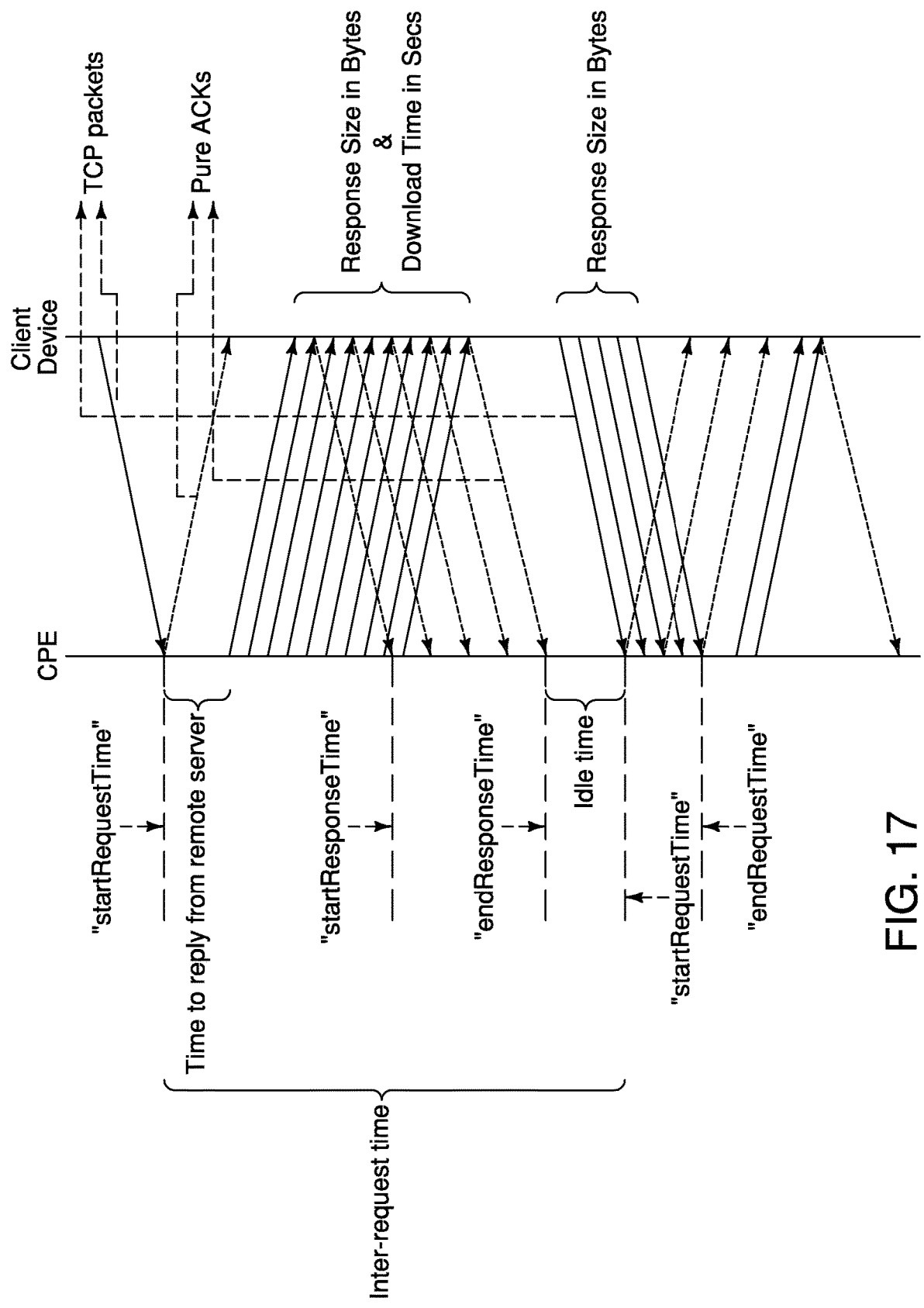
FIG. 17 illustrates a schematic timing chart of TCP packets exchanged between the CPE and a client device, object-level estimates from TCP statistics being obtained by monitoring TCP state machine at the CPE (if TCP Proxy), or TCP packet headers at the CPE.
Figure 18:
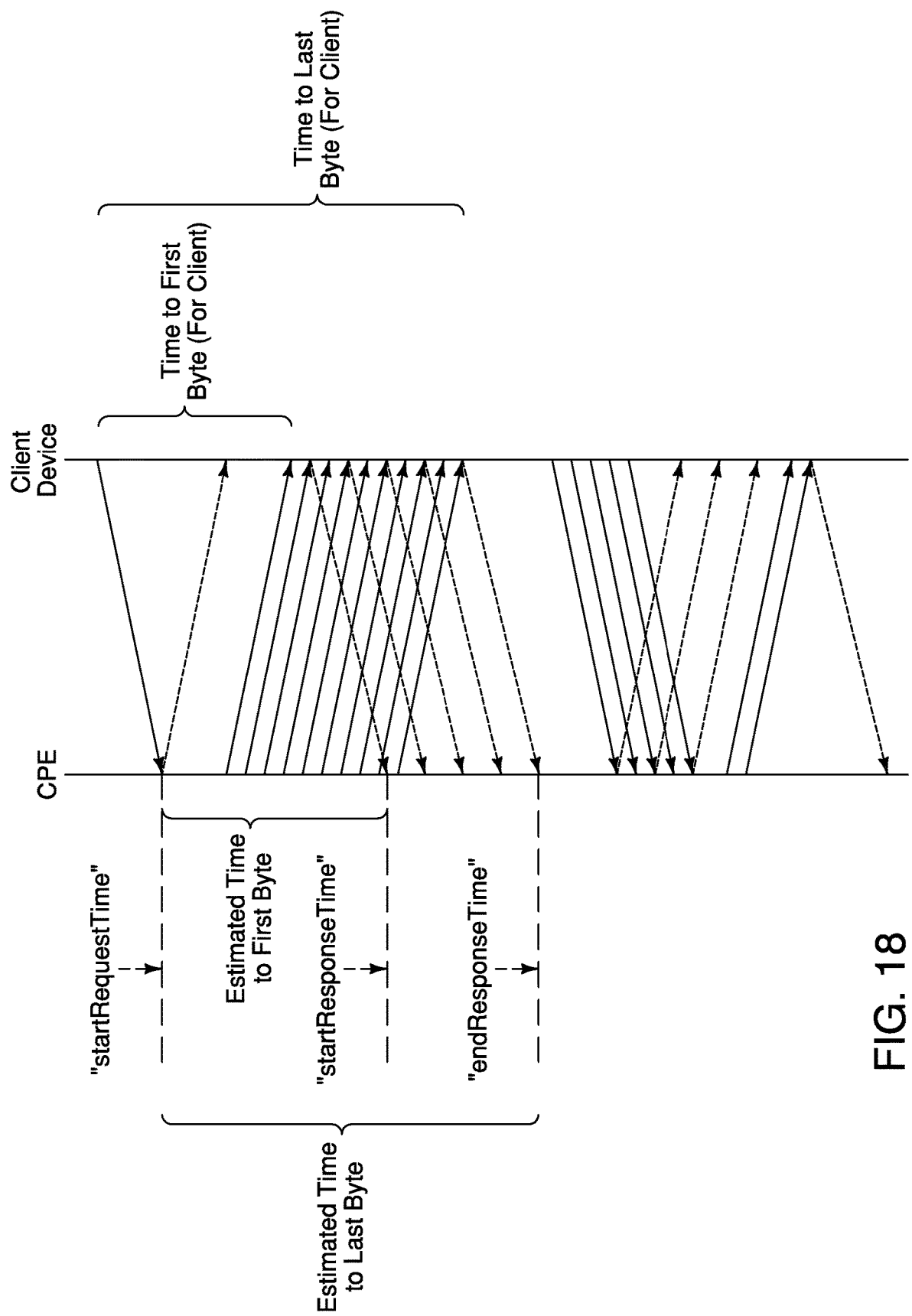
FIG. 18 illustrates a schematic timing chart of TCP packets exchanged between the CPE and the client device, Time to First Byte and Time to Last Byte for the client device being estimated at the CPE.

Referring now FIGS. 16 to 18, details about how to estimate useful application-layer QoS metrics are discussed (see Sections 3a to 3d). In particular, in the illustrated embodiment, the QoS metrics can be estimated from a single measurement point located, for example, at CPE. Without this approach of the present disclosure, some of these metrics could only be measured or estimated with help from client-side devices or client/server applications. In the illustrated embodiment, as shown in FIG. 17, the application-layer QoS metrics can be estimated by monitoring the TCP state machine at the CPE 30 (if TCP Proxy) or TCP packet headers at the CPE 30. In the illustrated embodiment, for the sake of brevity, only one client device is illustrated in the timing chart in FIG. 17. However, the network diagnostic algorithm can handle multiple client devices by, for example, using IP addresses or MAC addresses or NAT table information to associate different traffic for individual devices. Furthermore, same idea can be extended for individual CPE or individual client devices within a CPE, even when this invention is implemented/practiced in Gateway or other core node as shown in FIG. 1.

3a. Time to First Byte (TTFB)

This is directly obtained as the difference:
startResponseTime−startRequestTime
for each requested object.

This metric captures the delay between the request and response packets. In the illustrated embodiment, this metric can be estimated at the CPE 30 as the time between HTTP(S) Request and Response, and obtained for every (estimated) Request-Response pair. Specifically, as shown in FIGS. 17 and 18, Time to First Byte for the client device 40 can be estimated at the CPE 30 as the delay between the request and response packets (TCP packets). This metric captures the variation in network delays and is more impacted by congestion in uplink/upstream (inroute) or downlink/downstream (outroute). But, this may also be impacted by server load. Other metrics defined below—Time to Download or Application-Layer Throughput, are heavily impacted by downlink congestion. Hence, taken together, these metrics can be used to infer uplink and downlink congestion. Also, in the illustrated embodiment, depending upon how startResponseTime, endResponseTime, etc. are determined (e.g., using TCP Segments and/or TCP ACKs), the LAN/local delay between the CPE 30 and the client device can be included (or excluded), for example.

In the illustrated embodiment, TTFB can also include the DNS request-response time, as noted by the browsers.

In the illustrated embodiment, instead of defining the metric for each object seen, summary statistics (e.g., representative value), like mean, median, etc. can also be computed for objects over certain duration, so as to come up with more concise way of capturing the metric. For example, the summary statistics of the metric derived based on distribution of individual values of the metric for each object over a short duration of time can be used as a value of the metric. Same approach can be applied to the following metrics as well. Of course, the individual values of the metrics can be used as values of the metrics, respectively, as needed and/or desired.

3b. Time to Last Byte (TTLB)

This is directly obtained as the difference:
endResponseTime−startRequestTime
for each requested object.

This metric captures the total delay in object download—from start of request to end of response. Specifically, as shown in FIGS. 17 and 18, Time to Last Byte for the client device 40 can be estimated at the CPE 30 as the total delay in object download (TCP packets). This encompasses all: uplink congestion, server delays as well as downlink congestion. Together with other metrics, this is useful in finding if the poor user experience for web-browsing is due to delays in object downloads or other reasons like DNS or client-device loading, etc. TTLB can also be similarly defined for video streaming objects. Many video streaming application use TTLB to compute the application layer throughput (including the request delays) to estimate the video playback rate. Hence, TTLB is an important metric.

3c. Time to Download (TTD) (Response Time/Download Time)

This is directly obtained as the difference:
endResponseTime−startResponseTime
for each requested object.

This metric captures the time to download an object/response. The distribution of Time to Download for different ranges of response sizes is a useful metric in finding downlink congestion.

3d. Application-Layer Throughput (DS)

This is directly obtained from the Response Size (in Bytes) and Time to Download:
Response Size*8/(endResponseTime−startResponseTime)
for each requested object, and measured in bits per second (bps).

This metric provides an estimate of the effective download speeds available to the application layer. In the illustrated embodiment, this metric can be estimated at the CPE 30 as an application-layer goodput estimate. This is a much more accurate QoS metric than PHY-layer data rates or IP-level network speeds, since they take into account the impact of packet losses, retransmissions, scheduling delays and protocol or packet header overheads.

However, because of the transport protocol mechanisms (e.g., slow start, congestion control, etc.), the Application-Layer Throughput estimates may be different for different ranges of response sizes. For a more usable QoS metric as an indicator of network conditions, filtering out download speed for short responses is preferable. For example, responses bigger than a predetermined size, such as 100KB, can be only considered when estimating the Application-Layer Throughput metric. Thus, this metric can be obtained from large responses and their download time. Of course, the predetermined size can be tweaked according to typical link/download speeds, and can be different for different ranges of ISP networks.

The Application-Layer Throughput can also be defined alternatively as
Response Size*8/(endResponseTime−startRequestTime)
Similarly, Application-Layer Upload Throughput can be defined as
Request Size*8/(endRequestTime−startRequestTime)

Additional QoS metrics, not described here, can be similarly estimated using similar techniques. Instead of looking at all the values of the QoS metrics for each object, derived metrics like percentiles, means, probability distribution, etc. over different windows of time (e.g., minutes, hours, days, etc.) can be utilized.

4. Passive Monitoring of QoS Metrics to Benchmark Normal Network Operating Conditions and Identify Degrading Conditions It is now described how the application-layer QoS metrics can be used to monitor network performance and detect performance degradation. They are just some of the illustrative ways in which the QoS metrics derived in previous sections can help in monitoring and characterizing the network performance. The approaches shown below are a subset of standard and widely practiced usage scenarios for many other network statistics. Hence, the goal here is just to show how the application-layer QoS metric estimates of the present disclosure can fit into a similar usage pattern, and can provide additional insights giving a different view from other existing/available network stats/metrics.

The examples in this section are shown using real estimates from a handful of test devices/CPE. Before start of using the estimates (as shown below), the actual QoS metrics measured on the browsers of the devices generating the test traffic was collected to validate the estimate accuracy. Estimated QoS metrics by the CPE 30 match the measured metrics by the test device browser for most traffic.

4a. Derive Usable Metrics from the Distribution of Object-level Stats Over a Monitoring Window (1 min/5 min/1 hour/1-day, Etc.) and Characterize/Qualify the Interval One of the first thing that can be done is to take the various raw QoS values obtained per object and derive readily usable metrics from them. Using values from a small number of objects may not reflect the actual network conditions.

For example, TTFB (Time to First Byte) for a few (or tens) of objects may be high due to transient network delays, but the network conditions are good in reality. Hence, more samples (>=threshSamples, for example) need to be used to derive the metrics, which are used for inferring the network conditions. Since the network conditions keep changing over time, samples over a finite time interval should be used to get QoS metrics for network conditions in that finite interval. Hence, the interval should be relatively small, e.g., minutes/hours vs. days/months.

Figure 5:
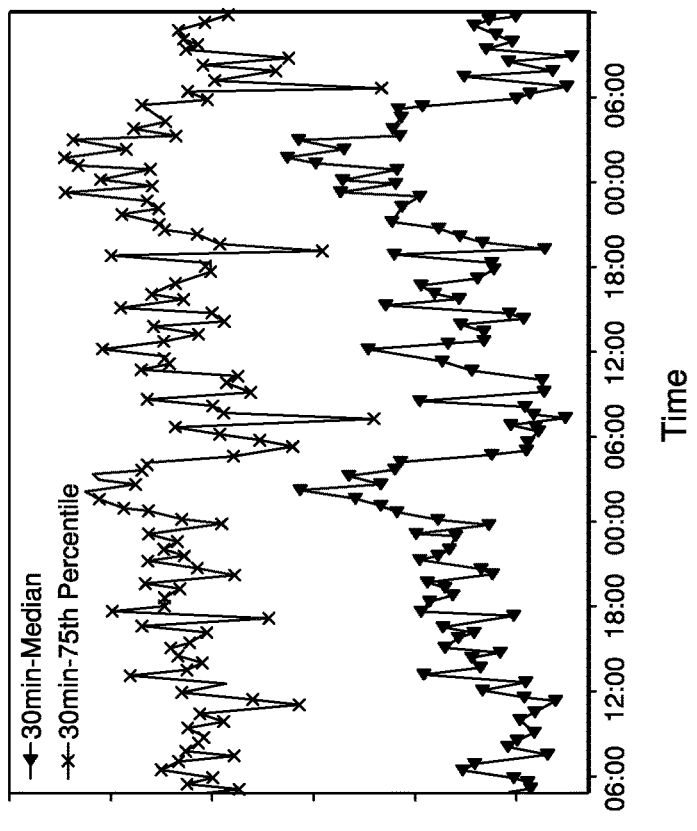
FIG. 5 illustrates a QoS metric (Time to First Byte) defined over different sample intervals.
Figure 5:
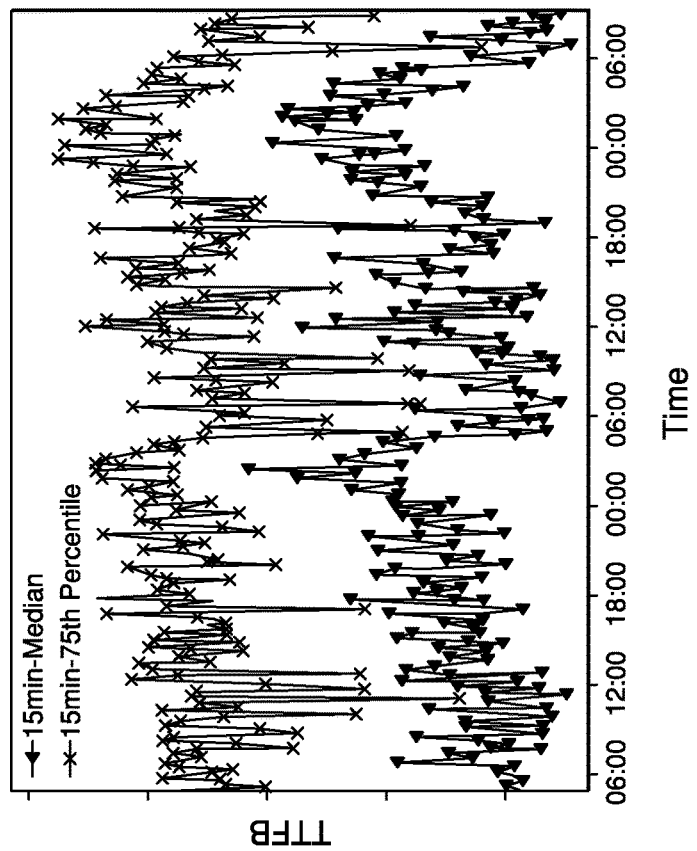

In FIG. 5, an example QoS metric (TTFB) that is defined over 15 minute or 30 minute intervals and defined as either the median or $75^{th}$ percentile/$3^{rd}$ quartile of TTFB values per object with those 15/30 minute intervals are shown. Whenever, the number of samples per interval<threshSamples, then that specific interval is not assigned any QoS metric estimate (or metric estimate value is labelled unknown for lack of samples). FIG. 5 shows estimates obtained from the CPE 30 for real data. As can be seen, the 15-minute estimates are similar to the 30-minute estimates, although with slightly higher variation across subsequent intervals (less robust metric definition). Similarly, the estimates defined over 5-minute (/1-hour) interval show similar trends although with higher (/lower) variation (figures not shown). Despite the small variations, the 15-minute interval for defining the metrics seem useful in characterizing the network conditions. For example, the TTFB QoS metric, defined as the median over TTFB samples per 15 minute interval, shows consistent high values during 00:00-06:00 hours (indicating degraded conditions) and low values during 06:00-12:00 hours (indicating good network conditions). Although not shown, QoS metrics derived over 5 minute durations are also obtained and subsequently used.

This short durations, for metric estimation, can imply passive monitoring of real user data over a short window can be used to characterize the network conditions. Alternatively, if the samples/metrics are not collected all the time, then they can be collected on per-need basis. For example, when trying to diagnose poor network conditions or user complaints, the users can be asked to run some traffic and collect the metrics over a finite and reasonable amount of time.

Being able to define robust metrics over short duration has many such advantages. However, depending upon the use case, even shorter intervals or larger intervals can be used with suitable changes to deriving the QoS metric from the raw values. For example, when analyzing long term trends in system congestion levels (as described in subsequent examples), daily, weekly or monthly averages can be derived. Based on the use case for the metrics, appropriate intervals and corresponding thresholds for normal or abnormal conditions can be defined accordingly. These thresholds are discussed next.

4b. Analyze the Patterns by Time of Day/Day of Week, Etc.

For some cases, the thresholds for QoS metrics can be set directly based on the target values (e.g., Application-layer Throughput should be close to the subscribed speed plan, although the speed guarantees may be for lower-layer data rates). Alternatively, or when a concrete target range are not available for some metrics (like TTFB), the thresholds can be learned by monitoring the values over time. Also, simply monitoring the metrics over time, and not comparing with any thresholds, can also present useful information in network condition trends. For example, the network usage during peak hours within a day may show degraded QoS values vs. non-peak hours. Similarly, other weekly or seasonal trends may be evident from the data. Better thresholds for normal or degraded network conditions, for generating alerts for deeper analysis/diagnostics, can be defined accordingly.

For obtaining the QoS metric data over time, different approaches can be taken. This can be done by passive measurements from real customer data over extended periods of time (e.g., multiple weeks or months). This can be done even from a few test devices running traffic from a range of common internet applications, but in real system/network with multiple real user. This way, the real system performance and patterns can be correctly monitored and analyzed. Patterns can be analyzed for individual sites (and set per-site thresholds) or by looking across a group of sites or all sites together.

Figure 6:
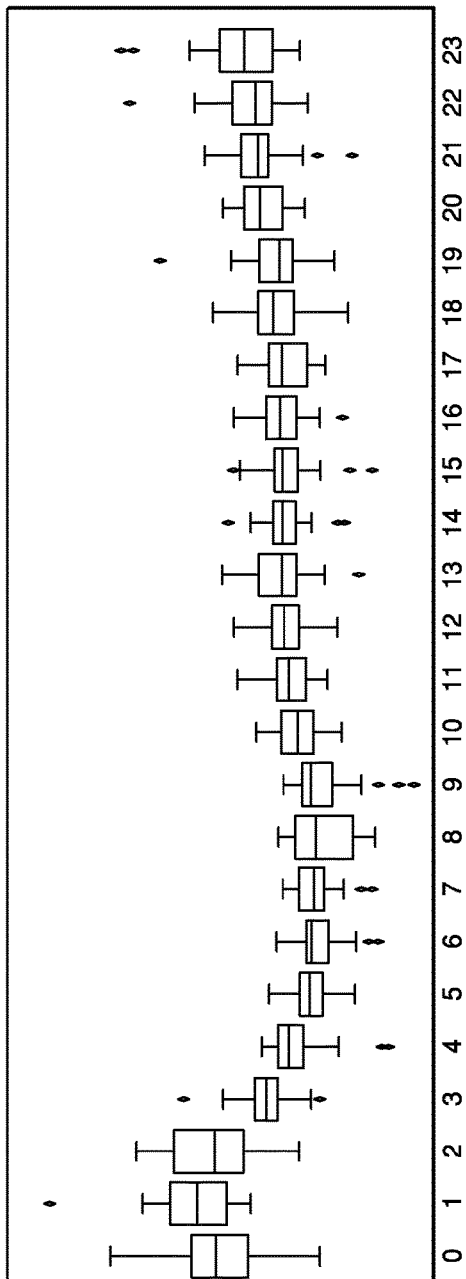
FIG. 6 illustrates hourly trends for an application-layer QoS metric (Time to First Byte)
Figure 7:
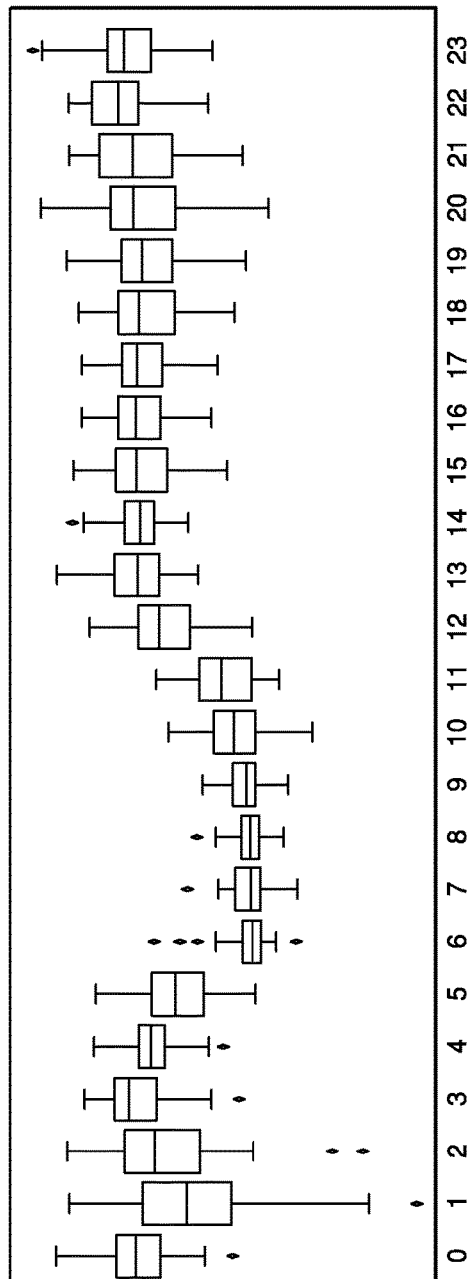
FIG. 7 illustrates hourly trends for an application-layer QoS metric (Application-Layer Throughput)

FIGS. 6 and 7 show the QoS metrics (Time To First Byte (TTFB) and Application-Layer Throughput) plotted over time of the day. These were obtained by monitoring QoS values from one test terminal over several weeks. All the QoS metrics (say defined over each 5/15-minute interval as defined in Section 4a) were first obtained and the time-interval were labelled. Then doing a time-series analysis by grouping intervals by time of the day/hour, the box plots were obtained. These figures show interesting hourly trends. For example, FIG. 6 indicates that the TTFB values are usually higher (lower is better) during 0-3 hours and low during 5-7 hours. Similarly, FIG. 7 indicates, Application-Layer Throughputs are lower (lower is worse) during 6-9 hours. Implying the test site (or overall network conditions, if similar trends across multiple sites), experienced varying network conditions in which some QoS metrics were good and others were bad. And the hourly trends for different metrics were different. But given the range of the values in the box plots, these metrics shows a clear hourly pattern.

Such trend analysis can help in setting appropriate thresholds in qualifying the network conditions. For example, thresholds that take time-based trends into account can be set. Or alternatively say, based on the target thresholds (defined independent of the trends), that network conditions are usually degraded during 0-3 hours (high TTFB) and 6-9 hours (low Application-Layer Throughputs).

4c. Compare the Current Values Using Active Measurements with Nominal/Expected or Target Values For focused analysis of a user or test site, the metric estimates from CPE can be compared while running known traffic mix from user or test devices (active measurements). Having defined robust metrics from sample distribution (Section 4a) and defined appropriate thresholds after looking at the patterns (Section 4b), the metric estimates can be simply monitored over a short duration and compare with the pre-defined threshold to say something about the network conditions as experienced by the user or test site. If needed, multiple such tests can be repeated at different times to also account for varying conditions, either the system-level (as seen from the patterns in Section 4b) or just user/test site-specific (even after accounting for system-level variations).

4d. Compare the Current Values Using Passive Measurements with Nominal/Expected or Target Values The real advantage comes in when using the QoS metric estimates for the real traffic the user usually runs. Compared to active measurements with known traffic applications, actual user traffic from unknown/diverse traffic applications may show different and unexpected performance levels not commonly seen in the active tests from small set of internet applications. Moreover, active tests can be only performed over finite amount of time. Passive measurements can be obtained all the time, enabling analysis over longer time horizon. While these metrics can be passively obtained by monitoring all the connections, it is also possible to sample only a subset of connections and derive the metrics. The sampling of connections can be done using some pre-defined criteria (like port number, fraction of connections, etc.) or sampled randomly while keeping the samples statistically significant and representative of all the data.

Figure 8:
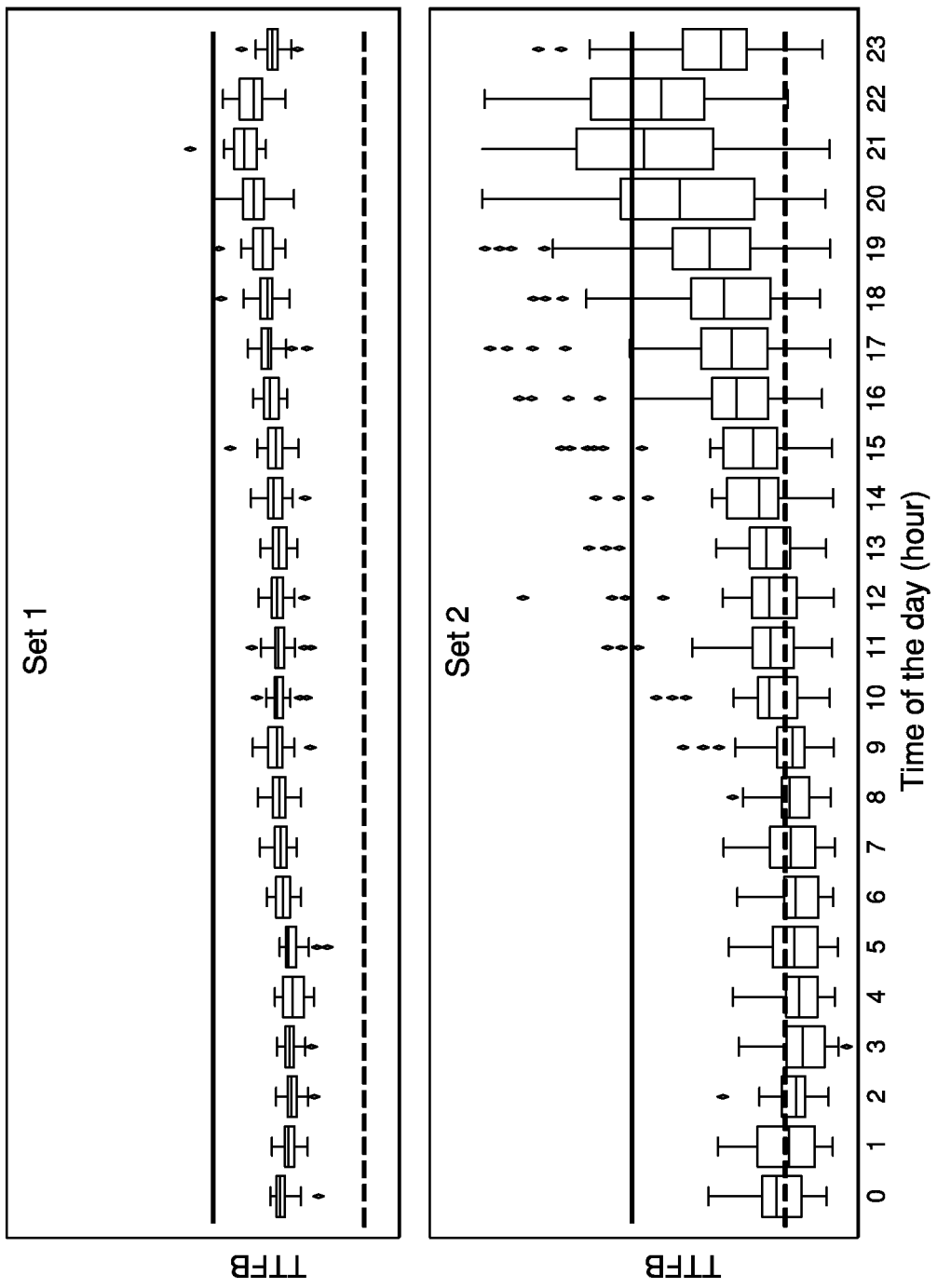
FIG. 8 illustrates hourly trends for the application-layer QoS metric (Time to First Byte) at different sites, illustrating results of monitoring Time To First Byte over time and comparing with pre-defined thresholds.
Figure 9:
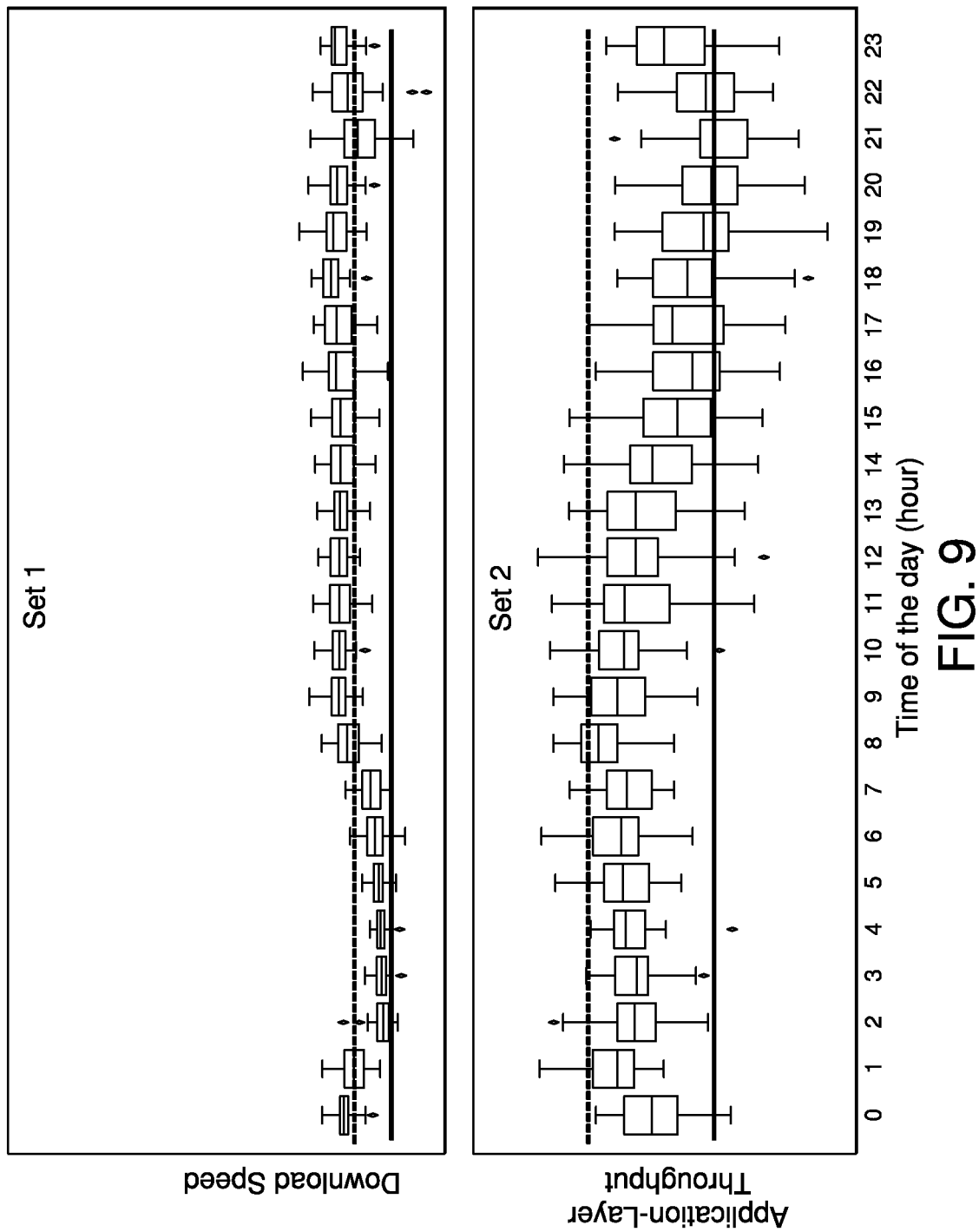
FIG. 9 illustrates hourly trends for the application-layer QoS metric (Application-Layer Throughput) at different sites, illustrating results of monitoring Application-Layer Throughput over time and comparing with pre-defined thresholds.

Referring now to FIGS. 8 and 9, two QoS metrics—TTFB and Application-Layer Throughput are discussed, respectively. Here, data from two test sites (Set 1 and Set 2) are discussed just for illustrating contrasting scenarios/network conditions as experienced by the two test sites. The figures show box plots of QoS metrics obtained over several intervals (5-minute) and grouped by time of the day (clock hour), when monitoring all the connections. The box plots were obtained from data over several weeks, but could have been obtained just from 1 day or 1 week as well. The figures also show two thresholds—"solid line" indicating degraded network condition and "dotted line" indicating normal or expected operating conditions.

FIG. 8 shows the TTFB metrics, where the "solid line" for higher values of TTFB indicate degraded conditions. Site 1 data, indicated by Set 1 in the figure, rarely exceeds the "solid line," indicating the site rarely experiences poor state. However, values consistently higher than the desired "dotted line" indicates it is probably in some marginal, but not good state. Data from Site 2, indicated by Set 2, show periods of good intervals (during early morning non-peak hours) and periods of poor conditions (during evening peak hours). Here, the same thresholds are used for both the sites (either of the subfigures).

FIG. 9 shows the Application-Layer Throughput metrics. Here, for illustrative purposes, different thresholds are used for the two sites (Set 1 and Set 2). This can be, for example, to capture scenarios where Site 1 had a different speed plan (lower as shown in the figure) compared to Site 2. For Site 1, although the Application-Layer Throughputs are close to the poor conditions threshold ("solid line") for a few hours, for most of the hours, the target speeds ("dotted line") are exceeded. For Site 2, the target thresholds are rarely met.

Figure 10:
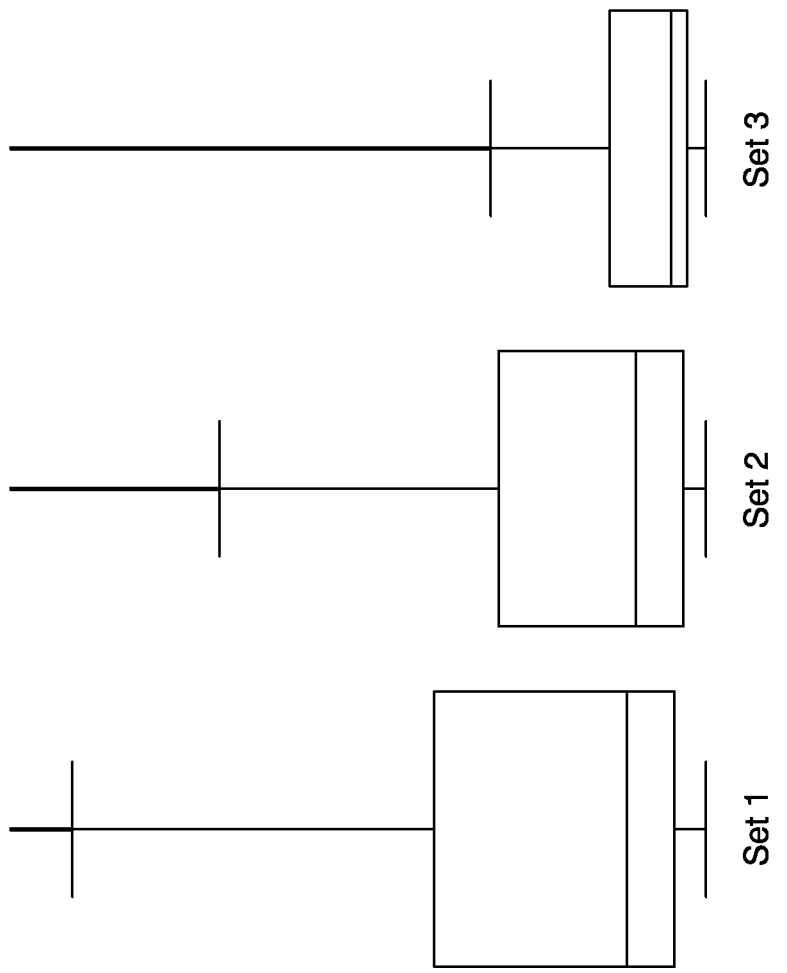
FIG. 10 illustrates distributions of the application-layer QoS metric (Time to First Byte) over different datasets collected several months apart.

4e. Analyze the Trends Over Historical Data Extending Over Larger Periods of Time One can monitor the changing levels of normal/average performance levels and learn about the trends over time. For example, FIG. 10 shows the box plot of TTFB metrics obtained from same test site but at different points of time. Each set (Set 1, 2 and 3) represents distribution of TTFB metric over 3-4 weeks, and each set is separated by several months. Set 3 is the oldest and Set 1 the newest. By analyzing the trend over time, the figure indicates that the network conditions are getting worse over time (higher TTFB).

4f. More Detailed/Tailored Performance Monitoring

So far, the QoS metrics are defined by taking the values for each object and ignoring the traffic classes. In reality, traffic from different applications may be assigned resources according to the application needs and available system resources (e.g., higher priority for interactive traffic and web-browsing, and lower priority for bulk downloads that can be run in the background). Different traffic classes may have different QoS characteristics and performance targets—e.g., lower priority traffic will have higher delays/TTFBs and lower speeds/DS, etc. Hence, obtaining the above QoS metric per each traffic class can provide additional insightful information for network monitoring purposes. Each of the above QoS metrics (and their corresponding thresholds) can be defined and derived for each of the different traffic classes/priorities. Here, similar method can be used as above, but applied to the subset of connections/objects which are mapped to the different classes, depending upon the traffic classification rules (which are usually applied to each connection).

5. Additional QoS and QoE Metrics

Apart from the QoS metrics described in Section 3, which focus more on application-layer performance characterization, additional QoS metrics focusing on lower layers, including Link-layer or Transport-layer as well as metrics focusing on specific network components like WiFi, Satellite, etc. or even smaller sub-components, can be used. As an illustrative example,(W)LAN Health Indicator (HI) metric described in U.S. Patent Application Publication No. 2016/0212031 A1 (hereinafter "Reference 4"), which is incorporated by reference herein in its entirety, can be used as a QoS metric to characterize any performance degradation in (W)LAN segment, as opposed to any other network component/segment in the end-to-end path between the user/client device and web servers (details in later section). Similarly, other metrics for various important network components, including not just from the CPE but other network segments (e.g., from Satellite Gateway, etc.) can also be added.

Some of these QoS metrics may directly indicate the root cause of poor network performance. For example, low value of (W)LAN Health Indicator will say that the (W)LAN is the bottleneck causing bad performance. However, the use of multiple QoS metrics together can help in better and more detailed network diagnostics. In some cases, the component-level QoS metrics may be close to the thresholds, not enough to indicate/flag that component. In some cases, there may be multiple components with poor performance indicators. By looking at all of the available metrics together, both the previous scenarios can be covered, and the root cause can be pointed out in a more accurate way. Using more diverse metrics which capture the different aspects/components will increase the coverage of the network diagnostic capabilities.

Apart from the QoS metrics that help characterize the network conditions, Quality of Experience (QoE) metrics, which characterize the user experience depending on the applications they are running, can also be used. These QoE metrics are impacted by both the network conditions, as well as the web server and client applications. Different QoE metrics are appropriately defined for different web applications like web-browsing, video streaming, downloads, etc. Some of the QoS metrics are described below.

5a. Web-Browsing QoE

As discussed in K. Iain, R. Durvasula and C-J Su, "Method for Estimation of Quality of Experience (QoE) Metrics for Web Browsing Using Passive Measurements", U.S. Provisional Application No. 62/787,226 (hereinafter "Reference 3"), which is incorporated by reference herein in its entirety, web-browsing QoE metrics like Page Load Time can be obtained. Similar to the QoS metrics described in Section 3, "Reference 3" gives a mechanism for obtaining the QoE metric estimates using passive measurements. Hence, there is no need to run active test to measure QoE. There may be other ways, apart from "Reference 3". to obtain equivalent web-browsing QoE metrics. Some of them might involve running (active) test traffic to measure QoE, metrics instead of obtaining passive estimates. Any such methods can be used to obtain some QoE metrics, which can be used for network diagnostic as described later.

5b. Video QoE

Video streaming QoE estimates can also be used if available. Some of the commonly used metrics include Startup Delay, Video Resolution, Rebuffering Rate/Ratio, Avg. Bitrate, etc. Some of these could be obtained for unencrypted Video streaming applications. However, for encrypted video streaming applications (most of the current ones are encrypted nowadays), these QoE metrics cannot be currently obtained using passive measurements, but can be obtained by running active tests and getting additional information from user devices. Furthermore, if some of these metric estimates is obtained using passive measurements in a way similar to "Reference 3," then these metrics estimates can also be used. Thus, any of the available metrics can be used for the network diagnostic purpose.

5c. Bulk QoE

For bulk upload or download applications like Google Drive, Dropbox, etc. the application-layer Upload and Download Speeds directly characterize the user QoE. In Section 3, it is described how to obtain Application-Layer Throughput for all type of traffic. For the current purpose, the Download Speed estimates can be found for the traffic of interest (connections/objects for Google Drive, Dropbox, etc.). Similarly, Upload Speed can also be defined based on time startRequestTime, endRequestTime and Request Size:
Request Size*8/(endRequestTime−startRequestTime)

6. Utilizing QoS and QoE Metrics for Manual or Automated Network Diagnostic and Root Cause Analysis In earlier sections, various QoS and QoE metrics and how they can be used for network performance monitoring are described. The usual methods when using such network stats or metrics is for manual/visual analysis by network operators, or for generating alerts (like ScienceLogic's EM7—network performance monitoring tool) whenever any one of them exceeds a pre-defined thresholds or meets certain pre-set criteria. However, the alerts are generally set for each metric individually or a subset of related metrics for a specific network component (e.g., Signal Quality and PHY Layer error rate, for each Physical link). Thus, these approaches typically target one (or a few) network component(s) at a time. For example, a set of alerts for monitoring the gateway congestion, another set of alerts for monitoring link quality to individual sites, etc. However, the thresholds/rules for each QoS metrics or network stats are defined largely independent of other thresholds. And thus, various network components are seldom looked together as a whole. In practice, this results in many problems getting undetected due to the limitations of the above approach. For example, each network component may be working in 'good' conditions according to the metric levels and absence of alerts, but their combined state and interaction does result in poor experience for the user. Such cases indeed are common when the system-level congestions are below the threshold (still good) and the link quality to individual site is still okay, but the combination results in a lot of user complaints. Such events go undetected by the monitoring tools (fails to identify the problem proactively) and even when troubleshooting the user complaints, remain unresolved because individual network components have reasonably good metric values. Hence, a better method is needed, which takes a more holistic approach. In this section, two such approaches (described later along with FIGS. 12 and 15) are discussed, which take into account all metrics (or at least the important ones at least from user-centric point of view) as a whole.

Another aspect or limitation of the traditional monitoring methods and tools is their focus on bottom-up diagnostics—metrics and alerts focusing on network components. In the illustrated embodiment, an alternative, and in some ways complementary, top-down approach is taken, which starts with user-centric QoE metrics and higher-layer (like application-layer) QoS metrics to detect performance degradation if any, and then progressively drills down to smaller and smaller network components or network-layers (using additional appropriate metrics) to pin-point the root cause of network degradation.

Figure 11:
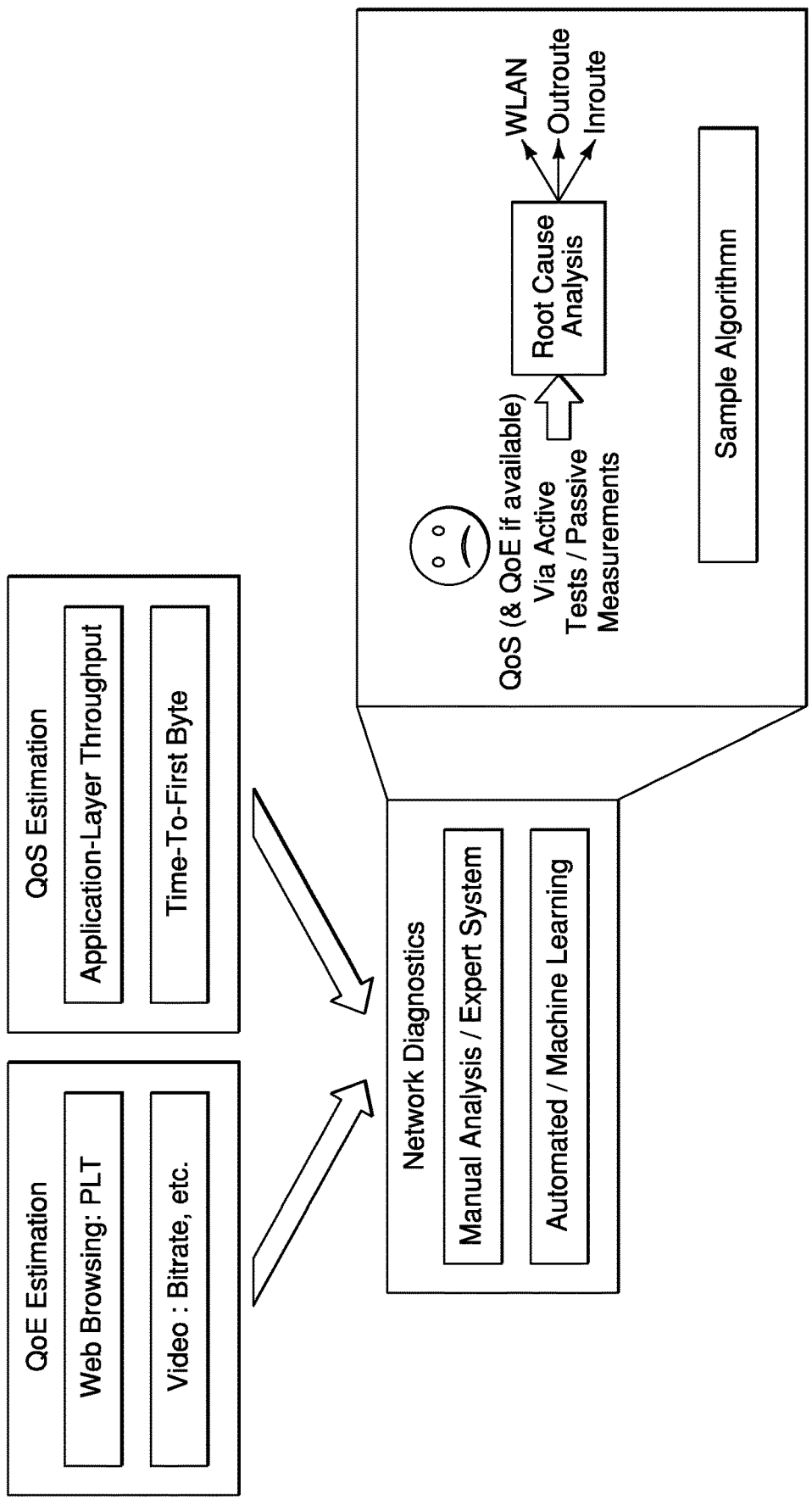
FIG. 11 illustrates a schematic diagram showing an overview of the network diagnostic algorithm using the application-layer QoS metrics and application-specific user QoE metrics for performing network diagnostics and root cause analysis.

The network diagnostic and root cause analysis can be achieved using a manual approach—using a set of pre-defined rules or flow chart as guidance or knowledge-base for network operators to monitor performance and diagnose any detected problems. Alternatively, automated algorithms are defined for such network diagnostics which directly give the root cause as the output, with no manual steps involved. FIG. 11 shows an overview of such approaches (details follow). Such diagnostic systems can be designed according to the set of available metrics and achieve varying degree of automated network diagnostic capabilities. In case the automated diagnostic and root cause analysis outputs are detailed enough, they can be used in a closed-loop feedback system to automatically correct the identified problems. In some cases, corrective action might need additional manual steps (e.g., additional hardware for added capacity). But in some cases, the corrective action can include some configuration changes which can be done algorithmically. Such scenarios can even be developed into self-corrective, self-optimizing system.

Focusing on the top-down approach, FIG. 11 shows an overview of a system using a small set of QoE and QoS metrics for root cause analysis. The metrics can be passively monitored all the time by the CPE 30, or can be actively collected at the CPE 30 over a limited time (when running known/unknown traffic mix on client or test site). In case of poor user QoE, sample output for possible root cause can be WLAN (local segment), Inroute (/Downlink from WAN/remote server) or Outroute (/Uplink to WAN/remote server).

Figure 12:
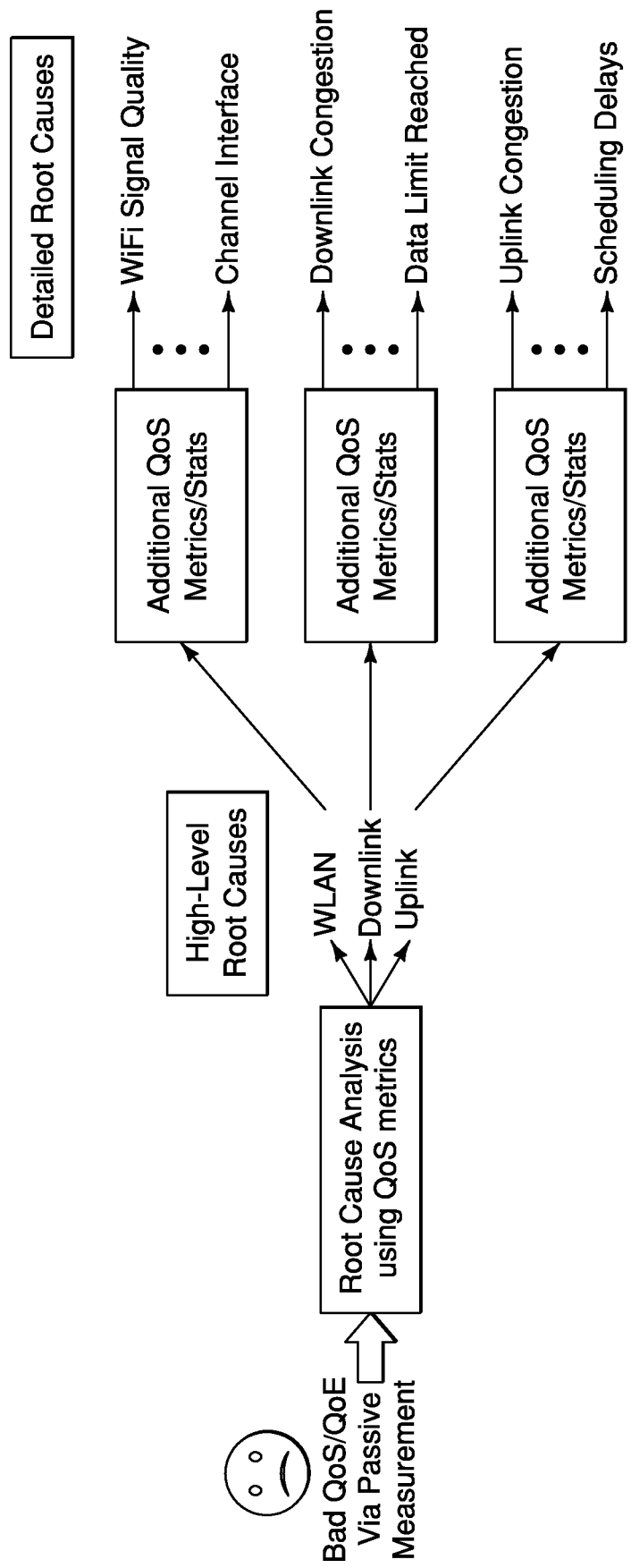
FIG. 12 illustrates a schematic diagram showing a more detailed view of the network diagnostic algorithm for performing the root cause analysis using additional network statistics with a hierarchical approach.

In case additional metrics are available from different network components, more detailed root cause analysis can be achieved. FIG. 12 shows one such system, where the previous method using a hierarchical approach is extended. Extending the first-level diagnostic output, additional (detailed) metrics can be then used for focus on smaller subcomponents. For example, if the first-level says uplink section is the reason for poor quality of experience, then additional statistics from the different parts of the uplink segments can be looked at to localize the problem to relevant subcomponents. Potential problems within uplink can include system-level congestion leading to delays and lower speeds, or even scheduling delays (e.g., for wireless or satellite system) where the delays are not due to congestion, but inefficient scheduling algorithms.

This approach merges the top-down approach/higher-level analysis (initial stages of the hierarchy) with the more traditional bottoms-up approach (component-level analysis). This hierarchical approach is more amenable to manual/expert operator led algorithm development. Experts from different components can build their expert knowledge into the various parts of the algorithm. Any coverage gap will result in high-level diagnostic, but not detailed diagnostics. Additional expert help in handling such instances can be utilized in improving the algorithms and achieve improved detailed diagnostics later. Or in some cases, such instances can show the need for additional detailed metrics to be collected, to reduce the coverage gaps.

Till now in this section, the high-level view has been given. Now, the details about a few sample algorithms for automated network diagnostic are discussed.

Algorithm 1

Using Application-Layer QoS Estimates for Automated Network Diagnostic

Figure 13:
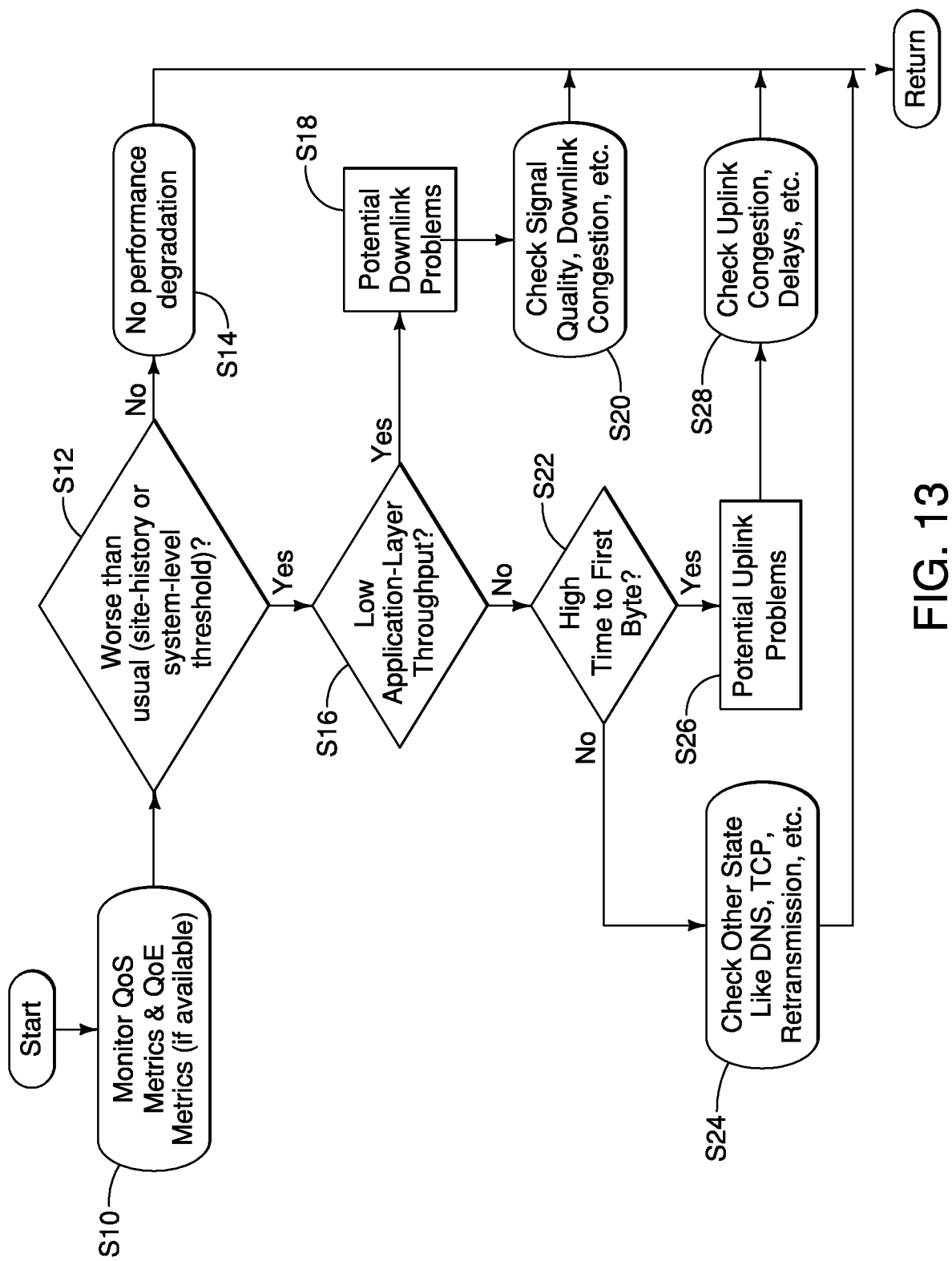
FIG. 13 illustrates a flowchart of an example of a rule-based root cause analysis with focus on the application-layer QoS metrics.

FIG. 13 shows an example of the network diagnostic algorithm of the present disclosure, which uses only a few application-layer QoS metrics (TTFB and Application-Layer Throughput) (defined in Section 3) and QoE metrics (Page Load Time—estimated using method in "Reference 3"). The network diagnostic algorithm shown in FIG. 13 illustrates how it can be used for high-level diagnostic as a first step towards detailed root cause analysis. The thresholds used within the algorithms can be defined using historical nominal values or target values, as described in Section 4.

In the illustrated embodiment, the controller 36 of the CPE 30 continuously performs the sample rule-based root cause analysis with focus on the application-layer QoS metrics shown in FIG. 13. Specifically, first, the controller 36 continuously monitors QoS metrics (e.g., TTFB, Application-Layer Throughput, etc.) (step S10). Also, in step S10, the controller 36 continuously monitors QoE metrics (e.g., Page Load Time (Durations)) if available. In particular, the controller 36 monitors the network stats of the TCP connection and determines the QoS metrics (see Sections 2 and 3). The controller 36 determines whether the monitored metrics is worse than usual (step S12). For example, in the illustrated embodiment, the controller 36 determines whether the monitored "Page Load Time" is higher than usual (i.e., higher relative to a site-history or system-level threshold) (step S12). Of course, if no QoE metrics is available in step S10, then in step S12, the controller 36 can checks if thresholds are exceeded for any of the QoS metrics. In the illustrated embodiment, if the monitored "Page Load Time" is not higher than usual ("No" in step S12), then the controller 36 diagnoses or determines that there is no performance degradation (step S14). Specifically, the controller 36 reports the diagnostic results to a central database of the external server 29, for example, such that the ISP can monitor the network conditions. Then, the process returns to step S10.

If the monitored "Page Load Time" is higher than usual ("Yes" in step S12), then the controller 36 further determines whether the monitored "Application-Layer Throughput" is low (i.e., lower relative to a predetermined threshold) (step S16). If the monitored "Application-Layer Throughput" is low ("Yes" in step S16), then the controller 36 diagnoses or determines that there are potential downlink problems (step S18), and analyses or determines the root causes of the downlink problems (step S20). Specifically, the controller 36 reports the diagnostic/analyzation results to the central database of the external server 29, for example. In this case, the controller 36 reports the diagnostic/analyzation results to prompt the ISP to check signal quality, downlink congestion, etc. Then, the process returns to step S10.

If the monitored "Application-Layer Throughput" is not low ("No" in step S16), then the controller 36 further determines whether the monitored "TTFB" is high (i.e., higher relative to a predetermined threshold) (step S22). If the monitored "TTFB" is not high ("No" in step S22), then the controller 36 analyses or determines the root causes of the problems (step S24). Specifically, the controller 36 reports the diagnostic/analyzation results to the central database of the external server 29, for example. In this case, the controller 36 reports the diagnostic/analyzation results to prompt the ISP to check other stats, such as DNS, TCP retransmission, etc. Then, the process returns to step S10.

If the monitored "TTFB" is high ("Yes" in step S22), then the controller 36 diagnoses or determines that there are potential uplink problems (step S26), and analyses or determines the root causes of the uplink problems (step S28). Specifically, the controller 36 reports the diagnostic/analyzation results to the central database of the external server 29, for example. In this case, the controller 36 reports the diagnostic/analyzation results to prompt the ISP to check uplink congestion, delays, etc. Then, the process returns to step S10.

In the illustrated embodiment, the controller 36 continuously monitors all QoS metrics (e.g., TTFB, Application-Layer Throughput, etc.) and QoE metrics (e.g., Page Load Time (Durations)) in step S10. However, of course, the controller 36 can selectively monitor the QoS metrics and QoE metrics as needed depending on determinations of steps 12, 16 and 22, for example. In the illustrated embodiment, the phrase "continuously monitoring" can refer to not only monitoring in a continuous manner, but also repeatedly monitoring by a short interval. Also, in the illustrated embodiment, in step S10, the controller 36 can monitors or samples the QoS/QoE metrics periodically or randomly.

Algorithm 2

Figure 14:
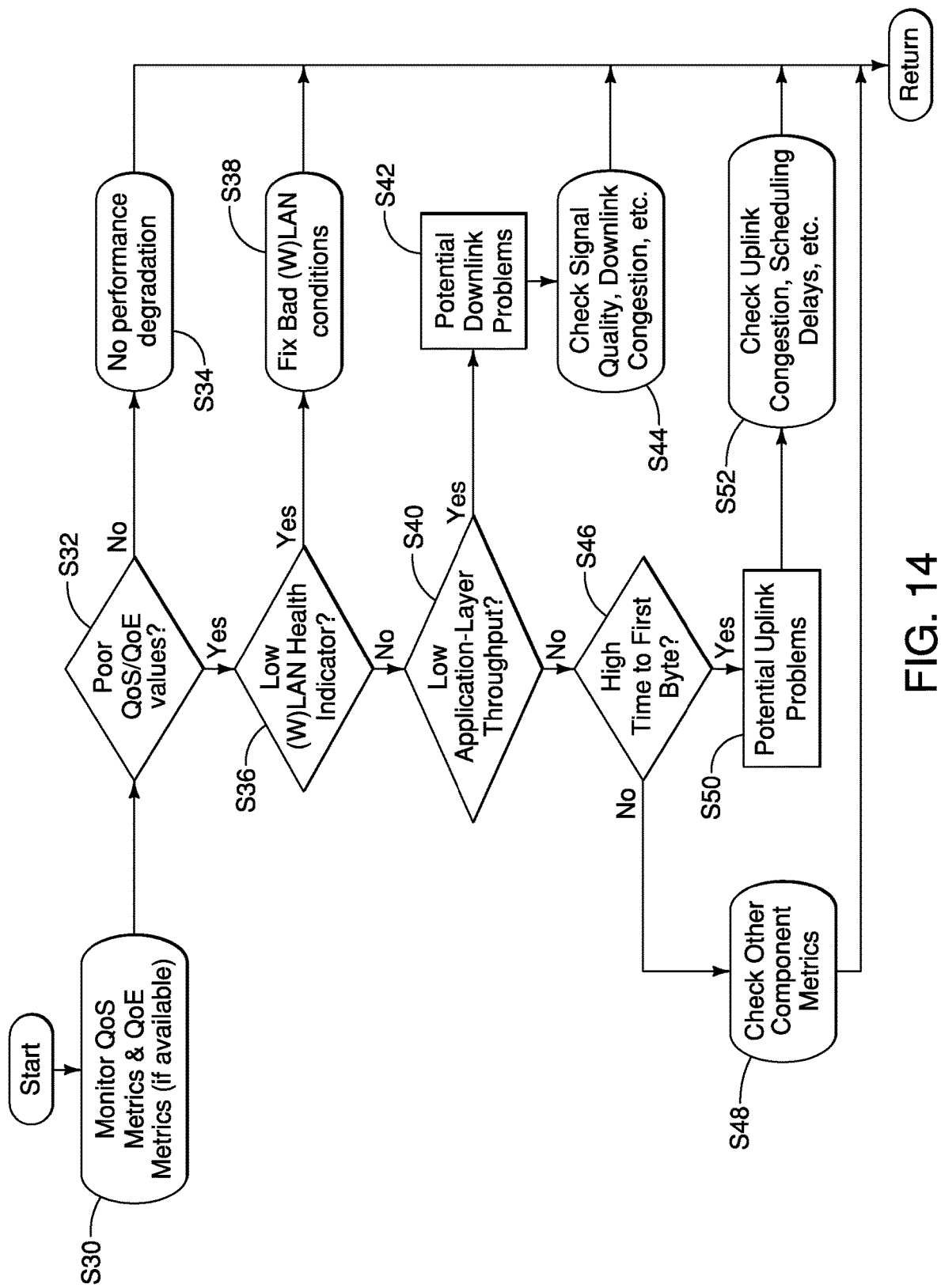
FIG. 14 illustrates a flowchart of another example of a rule-based root cause analysis using additional QoS metric (WLAN Health Indicator)

FIG. 14 shows another example of the network diagnostic algorithm of the present disclosure, which uses additional QoE metrics (e.g., Video QoE) and QoS metrics (e.g., WLAN Health Indicator). This is the algorithm that is used for the root cause analysis shown in the sample algorithm ("Sample Algorithm") in FIG. 11.

In the illustrated embodiment, the controller 36 of the CPE 30 continuously performs the network diagnostic algorithm shown in FIG. 14. Specifically, first, the controller 36 continuously monitors QoS metrics (e.g., TTFB, Application-Layer Throughput, (W)LAN Health Indicator, etc.) (step S30). Also, in step S30, the controller 36 continuously monitors QoE metrics (e.g., Page Load Time (Durations), Video QoE, or other QoE metrics (Section 5)) if available. In particular, the controller 36 monitors the network stats of the TCP connection and determines the QoS metrics (see Sections 2 and 3). The controller 36 determines whether the monitored "QoS/QoE value" is poor (i.e., lower relative to a predetermined threshold) (step S32). If the monitored "QoS/QoE value" is not poor ("No" in step S32), then the controller 36 diagnoses or determines that there is no performance degradation (step S34). Specifically, the controller 36 reports the diagnostic results to a central database of the external server 29, for example, such that the ISP can monitor the network conditions. Then, the process returns to step S30.

If the monitored "QoE value" is poor ("Yes" in step S32), then the controller 36 further determines whether the monitored "(W)LAN Health Indicator" is low (i.e., lower relative to a predetermined threshold) (step S36). If the monitored "(W)LAN Health Indicator" is low ("Yes" in step S36), then the controller 36 analyses or determines the root causes of the problems (step S38). Specifically, the controller 36 reports the diagnostic/analyzation results to the central database of the external server 29, for example. In this case, the controller 36 reports the diagnostic/analyzation results to prompt the ISP to fix bad (W)LAN conditions. Then, the process returns to step S30.

If the monitored "(W)LAN Health Indicator" is not low ("No" in step S36), then the controller 36 further determines whether the monitored "Application-Layer Throughput" is low (step S40). If the monitored "Application-Layer Throughput" is low ("Yes" in step S40), then the process proceeds to steps S42 and S44, which are basically identical to steps S18 and S20 in FIG. 13, respectively. Then, the process returns to step S30.

If the monitored "Application-Layer Throughput" is not low ("No" in step S40), then the controller 36 further determines whether the monitored "TTFB" is high (step S46). If the monitored "TTFB" is not high ("No" in step S46), then the process proceeds to step S48, which is basically identical to step S24. In this case, in step S48, the controller 36 reports the diagnostic/analyzation results to prompt the ISP to check other stats or other component metrics. Then, the process returns to step S30.

If the monitored "TTFB" is high ("Yes" in step S46), then the process proceeds to steps S50 and S52, which are basically identical to steps S26 and S28 in FIG. 13, respectively. In this case, in step S52, the controller 36 reports the diagnostic/analyzation results to prompt the ISP to check uplink congestion, scheduling, delays, etc. Then, the process returns to step S30.

Comparing the Algorithm 1 and Algorithm 2, different focus on the output root cause can be inferred/associated. For example, Algorithm 2, makes explicit use of QoS metric that point-to or rule-out the role of local (Wireless) LAN segment (from the CPE 30 to the client device 40). Hence, after eliminating those set of scenarios, the remaining diagnostic using TTFB and Application-Layer Throughput metrics focus on Uplink and Downlink problem, where Uplink and Downlink are looked at from the CPE 30 and not client device 40 (unlike Algorithm 1).

To verify the real-world utility of this algorithm, some experiments can be conducted on the test-bed with different network conditions. The algorithm is observed to give very accurate results in identifying the existence of degraded conditions and their root cause.

Lastly, the above algorithms focus on the most important root cause. It is possible that multiple pathologies exist and different algorithms can be similarly defined, where the flow marks all relevant problems instead of using a one problem at a time approach.

In terms of developing these algorithms, they can be devised using a rule-based approach based on expert domain knowledge. Alternatively, they can be formulated as classification problems using Decision Trees/Random Forest or Artificial Neural Networks or any other supervised-learning algorithms. Training data can be obtained from existing/historical logs and operator-or engineer-assisted labeling of ground truth (as described earlier).

7. Other Extensions for Automated Network Diagnostics

In the previous section, a few ways are shown by which QoS metrics and network stats can be utilized for designing automated or rule-based network diagnostics algorithms. They include mostly top-down approach and hierarchical approach, where more stats/metrics are added as and when needed. Alternatively, a holistic approach can also be taken. Specifically, all the available metrics can be taken together and come up with automated algorithms for network diagnostics. This can be framed as a machine-learning classification (supervised learning) problem, where a machine-learning model is trained using historical notes from network operators (ground-truth labels) and network logs/metrics (input data). In this case (machine-learning model), in the illustrated embodiment, the controller 36 (or the controller 24) can perform the network diagnostic of the network condition of the TCP connection by determining a root cause of the network condition of the network connection without setting an explicit threshold. Also, the controller 36 (or the controller 24) can perform the network diagnostic of the network condition of the network connection based on the one or more representative values by determining a root cause of the network condition of the network connection without setting an explicit threshold.

Figure 15:
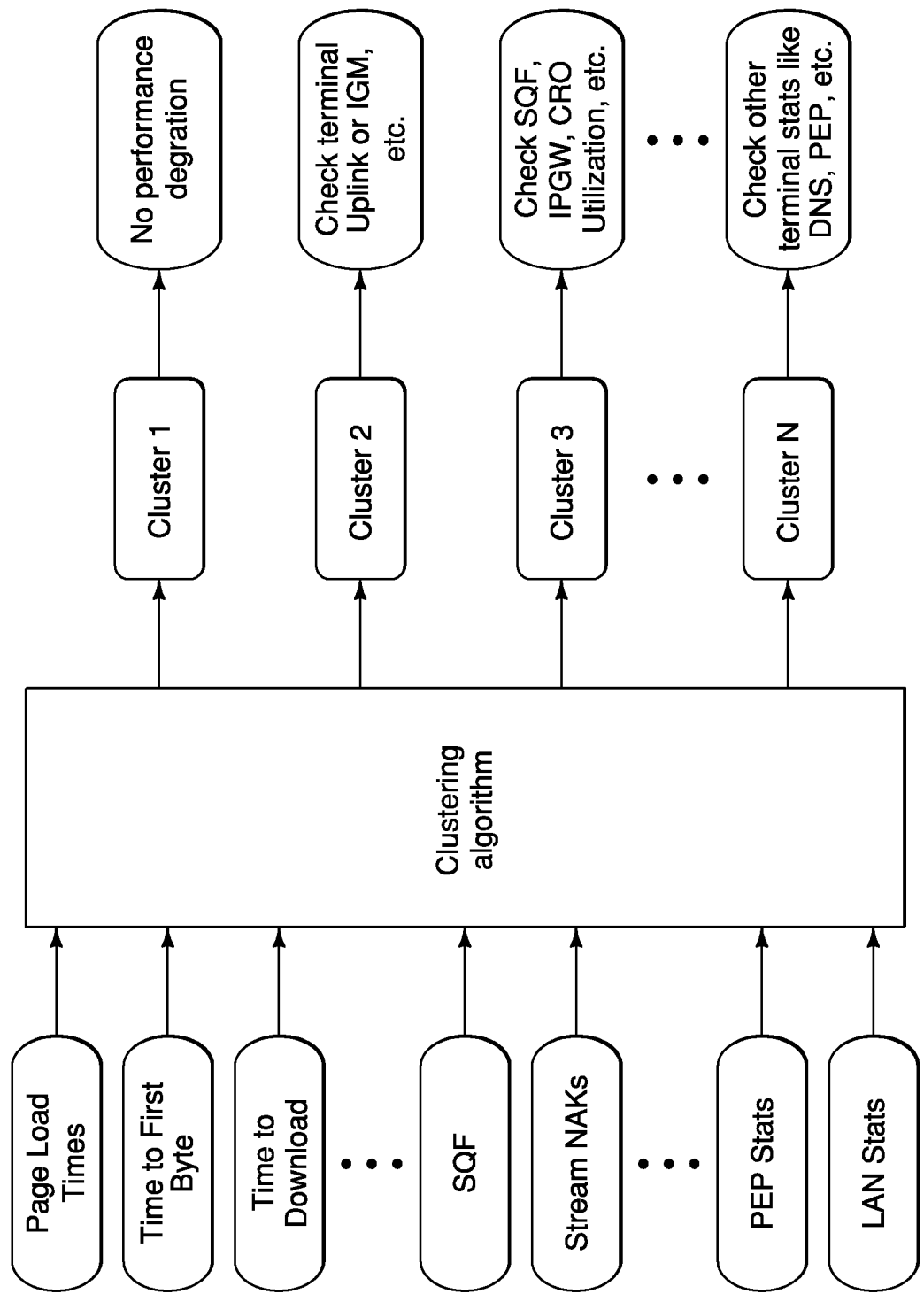
FIG. 15 illustrates a schematic block diagram showing an overview of a network diagnostic algorithm using an unsupervised clustering using available statistics and metrics for performing network diagnostics and root cause analysis.

However, it might be difficult to get data for many rare conditions as well as get the accurate labels for the root causes. Alternatively, unsupervised learning can be used to obtain different clusters for diverse network conditions. Each cluster (in a high-dimensional space) will correspond to range of values from related QoS metrics and can be used for root cause analysis. FIG. 15 shows a functional block diagram of the unsupervised clustering using all available stats/metrics for the network diagnostics and detailed root cause analysis. Specifically, FIG. 15 shows a possible set of input metrics, and possible clusters with associated root causes.

Using the above approaches, problem scenarios in network conditions can be proactively and automatically identified. For either the top-down approach or holistic approach, site-level diagnostic can be focused on, or a system/network-wide level troubleshooting solutions can even be focused on. In the illustrated embodiment, the application-layer QoS metrics as well as user QoE metrics are estimated directly within the CPE 30 (or the gateway 14). However, the application-layer QoS metrics as well as user QoE metrics can also be estimated at a central location (like ISP's core network, a gateway node connecting to the WAN or Network Operation Center (NOC) (e.g., the external server 29 in FIG. 1)). Or they can be estimated at individual CPE 30, but reported and stored in a central database, such as the external server 29 in FIG. 1. Other detailed metrics can be obtained from the corresponding network components and logged in the central database. Thus, these metrics, depending upon their availability, can be used for different levels of troubleshooting.

In the illustrated embodiment, the network diagnostic algorithm or method can be provided for estimating new QoS metrics which accurately capture the network conditions for end-user applications. These new QoS metrics are much better than existing set of network stats (which focus on lower-layers or network subcomponents) for end-user impact analysis. Moreover, they can be used by being combined with the existing set for a more complete view of network conditions, and can reduce the coverage gaps in identifying degradations.

Since these QoS metrics can be derived using passive monitoring, these QoS metrics can be obtained and monitored all the time. As described above, these QoS metrics can be used for troubleshooting user complaints, or better still, proactively detect (and correct) poor network conditions, before the user complains.

Furthermore, in the illustrated embodiment, the automated network diagnostics techniques enable not just proactive detection of network degradation, but also its root cause. Whenever possible, corrective actions can then be automatically enforced following the detailed root cause detection, ensuring little downtime and higher network reliability.

Moreover, since the QoS metrics can be monitored all the time, comparative studies can be carried out on a much larger scale (in terms of time, size and traffic diversity). They can be used to evaluate the impact of any network changes in the real production network, on user experience. They can thus aid in experimenting with algorithms or configurations to ensure higher network efficiency while guaranteeing high quality of service and user experience.

Even though the present disclosure focuses on the use of passive measurements (enabling continuous monitoring), these techniques can be also applied along with active tests (with known test terminals, end-user applications and their states) to troubleshoot specific problems.

In the illustrated embodiment, as shown in FIG. 1, one particular application of the network diagnostic method and apparatus of the present disclosure in a satellite network setting was discussed. However, the approach of the present disclosure can be applied to both satellite and terrestrial systems as well as both consumer and enterprise services. Furthermore, the approach of the present disclosure can be applied to any other type of network systems. These QoS metrics can be then used to monitor the network performance, as well as use for network diagnostic, automated or otherwise. By proactively identifying performance degradation, and trying to resolve the issues, this network diagnostic method and system (apparatus) can help to reduce customer complaints and churn. Also, these QoS metrics can aid in evaluating the impact of changes in network algorithms or configurations, and verifying that the new changes results in improved Quality of Service.

In the illustrated embodiment, the VSAT 18 (or the gateway 14) (e.g., the network monitoring apparatus) includes the controller 36 (or the controller 24) (e.g., the processor). The controller 36 (or the controller 24) is configured to monitor, at the CPE 30 (or the gateway 14) (e.g., the network node), one or more network statistics for each of one or more objects exchanged between the client device 40 (e.g., the client end point) and the web server 28 (e.g., the server end point) through the TCP connection (e.g., the network connection) (see Sections 2 and 3, FIG. 4, step S10 in FIG. 13, and step S30 in FIG. 14). The CPE 30 (or the gateway 14) is located between the client device 40 and the web server 28. The controller 36 (or the controller 24) is further configured to determine one or more QoS metrics for each of the one or more objects based on the network statistics for respective one of the one or more objects (see Sections 2 and 3, FIG. 4, step S10 in FIG. 13 or step S30 in FIG. 14).

In the illustrated embodiment, the controller 36 (or the controller 24) is further configured to monitor the one or more network statistics for each of the one or more objects by passively monitoring the one or more network statistics for each of the one or more objects (step S10 in FIG. 13 and step S30 in FIG. 14).

In the illustrated embodiment, the controller 36 (or the controller 24) is further configured to monitor the one or more network statistics by continuously monitoring the one or more network statistics for each of the one or more objects (step S10 in FIG. 13 and step S30 in FIG. 14). The controller 36 (or the controller 24) is further determine the one or more QoS metrics by continuously determining the one or more QoS metrics for each of the one or more objects based on the one or more network statistics for respective one of the one or more objects (step S10 in FIG. 13 and step S30 in FIG. 14).

In the illustrated embodiment, the one or more network statistics include at least one of a start time of an object request (startRequestTime), an end time of an object request (endRequestTime), a start time of an object response (startResponseTime), an end time of the object response (endResponseTime), and a data size of the object response (Response Size).

In the illustrated embodiment, the one or more QoS metrics include at least one of a time to first byte (TTFB), a time to last byte (TTLB), a time to download (TTD), and an application-layer throughput (DS) for each of the one or more objects.

In the illustrated embodiment, the controller 36 (or the controller 24) is further perform the network diagnostic of the network condition of the TCP connection based on the one or more QoS metrics (steps S16 to S28 in FIG. 13 and steps S36 to S52 in FIG. 14).

In the illustrated embodiment, the controller 36 (or the controller 24) is further configured to perform the network diagnostic of the network condition of the network connection by comparing the one or more QoS metrics with one or more predetermined thresholds, respectively (steps S16 and S22 in FIG. 13 and steps S36, S40 and S46 in FIG. 14).

In the illustrated embodiment, the controller 36 (or the controller 24) is further configured to perform the network diagnostic of the network condition of the TCP connection by further determining a root cause of the network condition of the network connection according to a result of the comparing of the one or more QoS metrics with the one or more predetermined thresholds, respectively (steps S18, S20 and S24 to S28 in FIG. 13 and steps S38, S42, S44 and S48 to S52 in FIG. 14).

In the illustrated embodiment, the controller 36 (or the controller 24) is further configured to perform the network diagnostic of the network condition of the network connection by calculating one or more representative values of the one or more QoS metrics based on the one or more QoS metrics determined over a predetermined time period, respectively (step S10 in FIGS. 13 and S30 in FIG. 14), and performing the network diagnostic of the network condition of the network connection based on the one or more representative values (steps S18, S20 and S24 to S28 in FIG. 13 and steps S38, S42, S44 and S48 to S52 in FIG. 14).

In the illustrated embodiment, the controller 36 (or the controller 24) is further perform the network diagnostic of the network condition of the network connection based on the one or more representative values by comparing the one or more representative values with one or more predetermined thresholds, respectively (steps S16 and S22 in FIG. 13 and steps S36, S40 and S46 in FIG. 14).

In the illustrated embodiment, the controller 36 (or the controller 24) is further configured to perform the network diagnostic of the network condition of the network connection based on the one or more representative values by further determining a root cause of the network condition of the network connection according to a result of the comparing of the one or more representative values with the one or more predetermined thresholds, respectively (steps S18, S20 and S24 to S28 in FIG. 13 and steps S38, S42, S44 and S48 to S52 in FIG. 14).

General Interpretation of Terms

In understanding the scope of the present invention, the term "comprising" and its derivatives, as used herein, are intended to be open ended terms that specify the presence of the stated features, elements, components, groups, and/or steps, but do not exclude the presence of other unstated features, elements, components, groups, integers and/or steps. The foregoing also applies to words having similar meanings such as the terms, "including", "having" and their derivatives. Also, the terms "part," "section," or "element" when used in the singular can have the dual meaning of a single part or a plurality of parts.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A network monitoring method comprising:
    monitoring, at a network node, one or more object-level statistics for each of one or more objects exchanged between a client end point and a server end point through a network connection, the network node being located between the client end point and the server end point;
    determining, without a measurement at the client end point and without a measurement at the server end point, one or more quality of service (QoS) metrics for each of the one or more objects, the one or more QoS metrics derived from the object-level statistics for respective one of the one or more objects, the object-level statistics including a difference between two time parameters taken at a measurement point at the network node as the one or more object is exchanged between the client end point and the server end point; and
    performing a network diagnostic of a network condition of the network connection using the one or more QoS metrics, the performing of the network diagnostic including comparing one or more representative values of the one or more QoS metrics with one or more predetermined thresholds and using the comparison to determine a root cause of the network condition of the network connection.

2. The network monitoring method according to claim 1, wherein
    the monitoring of the one or more object-level statistics for each of the one or more objects includes passively monitoring the one or more object-level statistics for each of the one or more objects.

3. The network monitoring method according to claim 1, wherein
    the monitoring of the one or more object-level statistics includes continuously monitoring the one or more object-level statistics for each of the one or more objects, and
    the determining of the one or more QoS metrics includes continuously deriving the one or more QoS metrics for each of the one or more objects from the one or more object-level statistics for respective one of the one or more objects.

4. The network monitoring method according to claim 1, wherein
    the one or more object-level statistics include at least one of a start time of an object request, an end time of an object request, a start time of an object response, an end time of the object response, and a data size of the object response.

5. The network monitoring method according to claim 1, wherein
    the one or more QoS metrics include at least one of a time to first byte, a time to last byte, a time to download, and an application-layer throughput for each of the one or more objects.

6. The network monitoring method according to claim 1, further comprising
    determining a root cause of network degradation of the network connection using the one or more QoS metrics.

7. The network monitoring method according to claim 1, wherein
    performing the network diagnostic of the network condition of the network connection further includes using one or more Quality of Experience (QoE) metrics.

8. The network monitoring method according to claim 1, comprising
    determining the one or more QoS metrics for each of the one or more objects without accessing information received from the client end point.

9. A network monitoring apparatus comprising:
    a processor configured to monitor, at a network node, one or more object-level statistics for each of one or more objects exchanged between a client end point and a server end point through a network connection, the network node being located between the client end point and the server end point,
    the processor being further configured to determine, without a measurement at the client end point and without a measurement at the server end point, one or more quality of service (QoS) metrics for each of the one or more objects, the one or more QoS metrics derived from the object-level statistics for respective one of the one or more objects, the object-level statistics including a difference between two time parameters taken at a measurement point at the network node as the one or more object is exchanged between the client end point and the server end point, and perform a network diagnostic of a network condition of the network connection using the one or more QoS metrics, the network diagnostic including comparing one or more representative values of the one or more QoS metrics with one or more predetermined thresholds and using the comparison to determine a root cause of the network condition of the network connection.

10. The network monitoring apparatus according to claim 9, wherein the processor is further configured to monitor the one or more object-level statistics for each of the one or more objects by passively monitoring the one or more object-level statistics for each of the one or more objects.

11. The network monitoring apparatus according to claim 9, wherein the processor is further configured to monitor the one or more object-level statistics by continuously monitoring the one or more object-level statistics for each of the one or more objects, and the processor is further configured to determine the one or more QoS metrics by continuously deriving the one or more QoS metrics for each of the one or more objects from the one or more object-level statistics for respective one of the one or more objects.

12. The network monitoring apparatus according to claim 9, wherein the one or more object-level statistics include at least one of a start time of an object request, an end time of an object request, a start time of an object response, an end time of the object response, and a data size of the object response.

13. The network monitoring apparatus according to claim 9, wherein the one or more QoS metrics include at least one of a time to first byte, a time to last byte, a time to download, and an application-layer throughput for each of the one or more objects.

14. The network monitoring apparatus according to claim 9, wherein the processor is further configured to perform the network diagnostic of the network condition of the network connection by comparing the one or more QoS metrics with one or more predetermined thresholds, respectively.

15. The network monitoring apparatus according to claim 9, wherein the processor is configured to determine the one or more QoS metrics for each of the one or more objects without accessing information received from the client end point.

16. A network monitoring method comprising:

monitoring, at a network node within a network of an internet service provider, one or more object-level statistics for each of one or more objects exchanged between a client end point and a server end point through a network connection, the network node being located between the client end point and the server end point;

determining, from within the network of the internet service provider, one or more quality of service (QoS) metrics for each of the one or more objects, the one or more QoS metrics derived from the object-level statistics for respective one of the one or more objects, the object-level statistics including a difference between two time parameters taken at a measurement point at the network node as the one or more object is exchanged between the client end point and the server end point; and performing a network diagnostic of a network condition of the network connection using the one or more QoS metrics, the performing of the network diagnostic including comparing one or more representative values of the one or more QoS metrics with one or more predetermined thresholds and using the comparison to determine a root cause of the network condition of the network connection.

17. The network monitoring method according to claim 16, comprising determining the one or more QoS metrics for each of the one or more objects without accessing information received from the client end point.

* * * * *